(12) United States Patent
Valtchev

(10) Patent No.: US 11,915,018 B2
(45) Date of Patent: *Feb. 27, 2024

(54) METHOD AND APPARATUS FOR USER INTERFACE MODIFICATION

(71) Applicant: Versata FZ-LLC, Dubai Media (AE)

(72) Inventor: Plamen Valtchev, London (GB)

(73) Assignee: Versata FZ-LLC, Dubai Media (AE)

( * ) Notice: Subject to any disclaimer, the term of this patent is extended or adjusted under 35 U.S.C. 154(b) by 27 days.

This patent is subject to a terminal disclaimer.

(21) Appl. No.: 17/407,051

(22) Filed: Aug. 19, 2021

(65) Prior Publication Data

US 2021/0382733 A1    Dec. 9, 2021

Related U.S. Application Data

(60) Continuation of application No. 15/931,079, filed on May 13, 2020, now Pat. No. 11,126,443, which is a
(Continued)

(51) Int. Cl.
*G06F 9/00* (2006.01)
*G06F 9/451* (2018.01)
(Continued)

(52) U.S. Cl.
CPC ............... *G06F 9/451* (2018.02); *G06F 8/34* (2013.01); *G06F 8/38* (2013.01); *G06F 40/14* (2020.01); *G06F 3/0481* (2013.01); *G06F 3/04812* (2013.01); *G06F 3/04847* (2013.01); *G06F 16/986* (2019.01); *G06F 40/103* (2020.01); *G06F 40/143* (2020.01); *G06F 40/166* (2020.01); *H04N 1/00501* (2013.01)

(58) Field of Classification Search
CPC ... G06F 9/451; G06F 8/34; G06F 8/38; G06F 40/14; G06F 3/0481; G06F 3/04812; G06F 3/04847; G06F 16/986; G06F 40/103; G06F 40/143; G06F 40/166; H04N 1/00501

See application file for complete search history.

(56) References Cited

U.S. PATENT DOCUMENTS 5,886,694 A * 3/1999 Breinberg ............... G09G 5/14
   715/788
6,662,341 B1 * 12/2003 Cooper ................... G06F 9/451
   715/234

(Continued)

FOREIGN PATENT DOCUMENTS

WO   WO-0244977 A1 * 6/2002 ......... G06F 9/44526

OTHER PUBLICATIONS

Interview Summary Record dated Aug. 19, 2021, filed in U.S. Appl. No. 15/931,079, p. 1.

(Continued)

*Primary Examiner* — Cesar B Paula
*Assistant Examiner* — David Faber

(57) ABSTRACT

A method and apparatus for modifying a user interface. The method comprises receiving user interface data at a client from a first server, receiving modification computer program code at said client, and executing said modification computer program code at said client to modify said user interface data to generate modified user interface data. The modification computer program code can be received from said first server or from a further server.

15 Claims, 37 Drawing Sheets

Related U.S. Application Data continuation of application No. 15/211,150, filed on Jul. 15, 2016, now Pat. No. 10,684,828, which is a division of application No. 11/994,993, filed as application No. PCT/GB2005/002714 on Jul. 8, 2005.

(51) Int. Cl.
| | |
|---|---|
| *G06F 8/34* | (2018.01) |
| *G06F 40/14* | (2020.01) |
| *G06F 8/38* | (2018.01) |
| G06F 3/0481 | (2022.01) |
| H04N 1/00 | (2006.01) |
| G06F 16/958 | (2019.01) |
| G06F 40/103 | (2020.01) |
| G06F 40/166 | (2020.01) |
| G06F 40/143 | (2020.01) |
| G06F 3/04812 | (2022.01) |
| G06F 3/04847 | (2022.01) |

(56) References Cited

U.S. PATENT DOCUMENTS

| | | | | |
|---|---|---|---|---|
| 6,915,271 B1* | 7/2005 | Meyer | ............... | G06Q 30/02 |
| | | | | 705/14.35 |
| 6,973,626 B1* | 12/2005 | Lahti | ............... | G06F 9/451 |
| | | | | 715/744 |
| 7,080,118 B2* | 7/2006 | Hildebrand | ............ | G06F 16/958 |
| | | | | 707/E17.116 |
| 7,930,206 B2* | 4/2011 | Koningstein | ...... | G06Q 30/0272 |
| | | | | 715/848 |
| 2001/0037218 A1* | 11/2001 | Kaker | ............... | G16H 20/10 |
| | | | | 705/2 |
| 2002/0078140 A1* | 6/2002 | Kelly | ............... | G06F 16/958 |
| | | | | 715/255 |
| 2002/0122063 A1* | 9/2002 | Weinberg | ............ | G06F 3/0481 |
| | | | | 715/764 |
| 2003/0004638 A1* | 1/2003 | Villers | ............... | G06F 3/038 |
| | | | | 701/431 |
| 2004/0230820 A1* | 11/2004 | Hui Hsu | ............ | H04L 67/01 |
| | | | | 726/26 |
| 2005/0096979 A1* | 5/2005 | Koningstein | ...... | G06Q 30/0277 |
| | | | | 705/14.68 |
| 2005/0278641 A1* | 12/2005 | Mansour | ............ | G06Q 10/109 |
| | | | | 715/749 |

OTHER PUBLICATIONS

Notice of Allowance dated May 25, 2021, filed in U.S. Appl. No. 15/931,079, pp. 1-9.

Terminal Disclaimer—Filed on Apr. 14, 2021, filed in U.S. Appl. No. 15/931,079, pp. 1-2.

Terminal Disclaimer—Accepted on Apr. 14, 2021, filed in U.S. Appl. No. 15/931,079, p. 1.

Response to Non-Final Office Action dated Mar. 30, 2021, filed in U.S. Appl. No. 15/931,079, pp. 1-13.

Non-Final Rejection dated Nov. 30, 2020, filed in U.S. Appl. No. 15/931,079, p. 1-12.

Response to Notice to File Corrected Application Papers dated Jul. 21, 2020, filed in U.S. Appl. No. 15/931,079, pp. 1-3.

\* cited by examiner

METHOD AND APPARATUS FOR USER INTERFACE MODIFICATION

The present invention relates to methods and systems for modifying user interfaces, and more particularly, but not exclusively to methods and systems for modifying computer program code representing user interfaces. The invention also relates to methods and systems for obtaining information indicative of user interface structure.

Computer users routinely need to use a plurality of different applications in order to complete tasks allocated to them, and each application typically has a separate user interface. Switching between the different user interfaces of the different applications in order to complete a given task considerably degrades user efficiency. It will often be the case that different applications are supplied by different vendors and accordingly their user interfaces have a different "look and feel", further degrading operator efficiency.

For example, in order to process customer enquiries, operators in a call centre may need to access a customer management application to access customer details, a billing application to access customer account information, and a payment application to process any payment which may be made by the customer over the telephone, for example by credit card. Working in this manner is inefficient, given that the operator is required to switch between applications in order to complete some tasks. Furthermore, a customer will typically remain on the telephone while the operator uses these different applications, and it is therefore advantageous to speed up the processing of enquires, in order to offer a higher quality customer service.

Various proposals have been made to enhance user efficiency when multiple applications need to be used.

The multiple applications can be combined into a single product or product suite. While such a proposal provides great increases in user efficiency, it is difficult and expensive to implement. Furthermore, such a combined product or product suite will typically have a different user interface from those used previously, therefore meaning that users need to be trained in use of the combined product, further increasing cost.

It has alternatively been proposed that the multiple application can be combined in some way. For example, all requests can be passed to a single one of the applications, and this application can be adapted to forward requests to an appropriate source application. Such a solution typically requires considerable customisation if it is to work in under all circumstances that may routinely arise, making such a solution difficult to implement.

Even when only a single application is to be used by a user, it is often desirable to be able to amend a user interface provided by an application vendor. For example, it may be desirable to inhibit certain functionality of the interface such that some users only have access to some applications functionality. Additionally, particular working practices within some organisations may make it desirable to add user interface elements to a user interface which have the affect of carrying out in a single step operations which, using the provided user interface, require a plurality of user interface elements to be used. Such modification can considerably improve user efficiency.

Heretofore, various proposals have been made relating to the modification and combination of user interface at a server. When suitably amended and/or combined, a user interface is then provided to a client computer. Although these methods operating at a server have wide applicability, they are unable to handle easily dynamic user interfaces. The term dynamic user interfaces is intended to mean user interfaces the operation of which is altered at a client, after the user interface has been provided to the client from a server. That is, user interface structure and functionality may be altered at runtime, and therefore a server may not have access to the data which is needed for modification. In such circumstances the server based modification and communication systems described above are unable to make necessary modification.

It is an object of embodiments of the present invention to obviate or mitigate at least some of the problems outlined above.

According to the present invention, there is provided a method and apparatus for modifying a user interface. The method comprises receiving user interface data at a client from a server, receiving modification computer program code at the client, and executing the modification computer program code at the client to modify the user interface data to generate modified user interface data.

Therefore, in accordance with the invention there is provided a method and apparatus which allows modification computer program code to be executed at a client to affect behaviour of a user interface provided by a server. This is a powerful mechanism of allowing modifications to be made to a user interface, even when elements of that user interface are generated at the client, for example using dynamic HTML (DHTML).

The modification computer program code may be received either from the first server or alternatively from a different server. The user interface data may comprise user interface computer program code, and the modification computer program code can then be configured to cause modification of the user interface program code.

In some embodiments of the present invention, a client computer receives a single computer readable file. A first portion of the computer readable file references the user interface data, while a second portion of the computer readable file references the modification computer program code. For example, the computer readable file maybe a HTML file, and a first and second portions may respectively be first and second frames within the HTML file. The first and second frames within the HTML file may reference the appropriate computer program code through the use of a Universal Resource Locaters (URL) identifying a location on the Internet from which appropriate computer program code can be provided.

It is sometimes the case that security mechanisms within web browser software prevent a first frame of a HTML file affecting operation of a second frame of that HTML file, unless the URL's is referenced by the frames are provided by common server. Therefore, in preferred embodiments of the present invention, the computer readable file is a HTML application (HTA) file, and the use of such a file overcomes the mentioned security mechanisms.

Modification computer program code may be configured to monitor operation of the user interface for occurrence of at least one predetermined event, and then to modify the user interface in response to detection of that event.

In some embodiments of the present invention, the user interface is provided to the client from the server in the form of a file containing user interface computer program code. In such embodiments of the present invention, the modification computer program code may be added to that file by a server, and then executed at the client to affect operation of the user interface. For example, the modification computer program code may comprise a function call which is executed when the user interface is to be displayed, to cause modification of the user interface.

According to a further aspect of the present invention, there is provided a method and apparatus for modifying input computer program code. The method comprises processing the input computer program code to identify first computer program code, and replacing the identified first computer program code with second computer program code and third computer program code. The second computer program code is configured so as not to be executed when the input computer program code is executed, and the third computer program code is configured to be executed when the input computer program code is executed. On its execution the third computer program code is configured to modify the second compute program such that the second computer program code is configured to be executed.

Processing input computer program code in this way provides a number of advantages. For example, the first computer program code may represent an instruction which is to be executed after a predetermined delay to allow that instruction to be modified in some way. In such a circumstance, the second computer program code can represent the first computer program code within a comment directive. Upon execution of the third computer program code, the second computer program code can be modified not only to remove the comment, but also to modify the first computer program code as is required.

Instructions enclosed within comments may include at least one instruction including a reference to a location, and the third program code may be then configured to modify this location. Locations associated with instructions can be specified using URL.

According to a further aspect of the present invention, there is provided a method and apparatus for executing computer program code. The method comprises processing the computer program code to identify second computer program code and third computer program code. The second computer program code is not executed, but the third computer program code is executed to modify the second computer program code such that the second computer program code is configured to be executed. The second computer program code may also be modified in other ways.

A further aspect of the present invention provides a method and apparatus for generating information indicative of a user interface structure. The method comprises processing computer program code defining the at the user interface. The processing associates at least one event handler with at least one element of the user interface, and the or each event handler is configured to provide information relating to the user interface.

By using this method, event handlers triggered by events such as mouse movement can be associated with particular elements, so as to highlight user interface elements as a pointer is moved across the user interface. For example, in a user interface comprising a plurality of frames, event handlers can be associated with at least some of the frames and movement of the pointer over the frames can cause the frame boundaries to be highlighted.

Alternatively or additionally, an event handler associated with a mouse click event can be associated with a particular user interface element, and upon selection of that user interface element, data relating to that user interface element may be obtained and, preferably, displayed to the user. The data obtained may represent the hierarchical location of the user interface element and may additionally represent computer program code defining that user interface element.

It will be appreciated that aspects of the present invention may be implemented in a large number of ways, including as methods, apparatus, systems, computer programs, computer readable media carrying such computer programs, and as computer readable files.

Embodiments of the present invention will now be described, by way of example, with reference to the accompanying drawings, in which.

Figure 1:
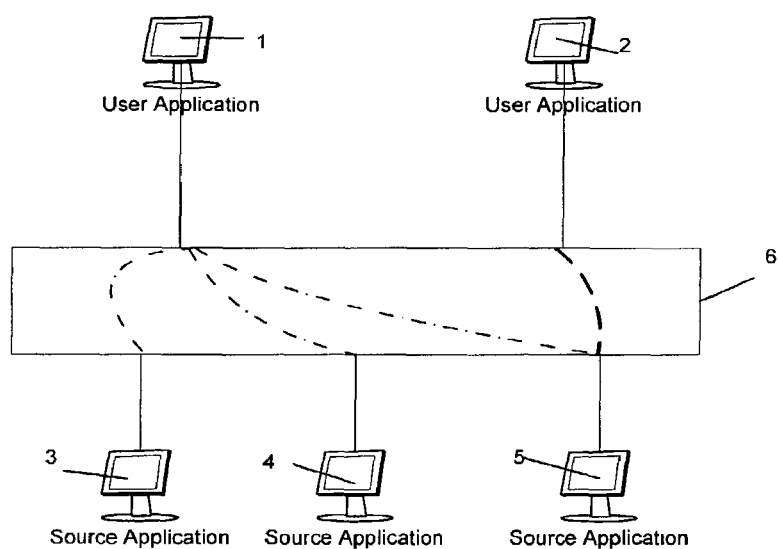
FIG. 1 is a schematic illustration showing an overview of an embodiment of the present invention.

Referring first to FIG. 1, there is illustrated a network of computers configured so as to provide users with user applications 1, 2, having associated graphical user interfaces. The user applications 1, 2 are based upon source applications, 3, 4, 5. The user applications 1, 2 have user interfaces made up of user interface elements taken from user interfaces associated with one or more of the source applications 3, 4, 5. Generation of the user applications is controlled by a composer 6. In the illustrated embodiment, it can be seen that the user application 1 is generated using interface elements taken from each of the three source applications 3, 4, 5. The user application 2 however is generated using user interface elements taken only from the source application 5. In addition to manipulating user interface elements provided by the source applications 3, 4, 5, the composer 6 is configured so as to be able to generate additional user interface elements for inclusion in a user application. User interface elements provided by one of the source applications 3, 4, 5 can also be modified by the composer 6, prior to inclusion in a user application. The composer 6 is provided in the form of computers running appropriately configured program code, relevant parts of which are described in further detail below.

Figure 2:
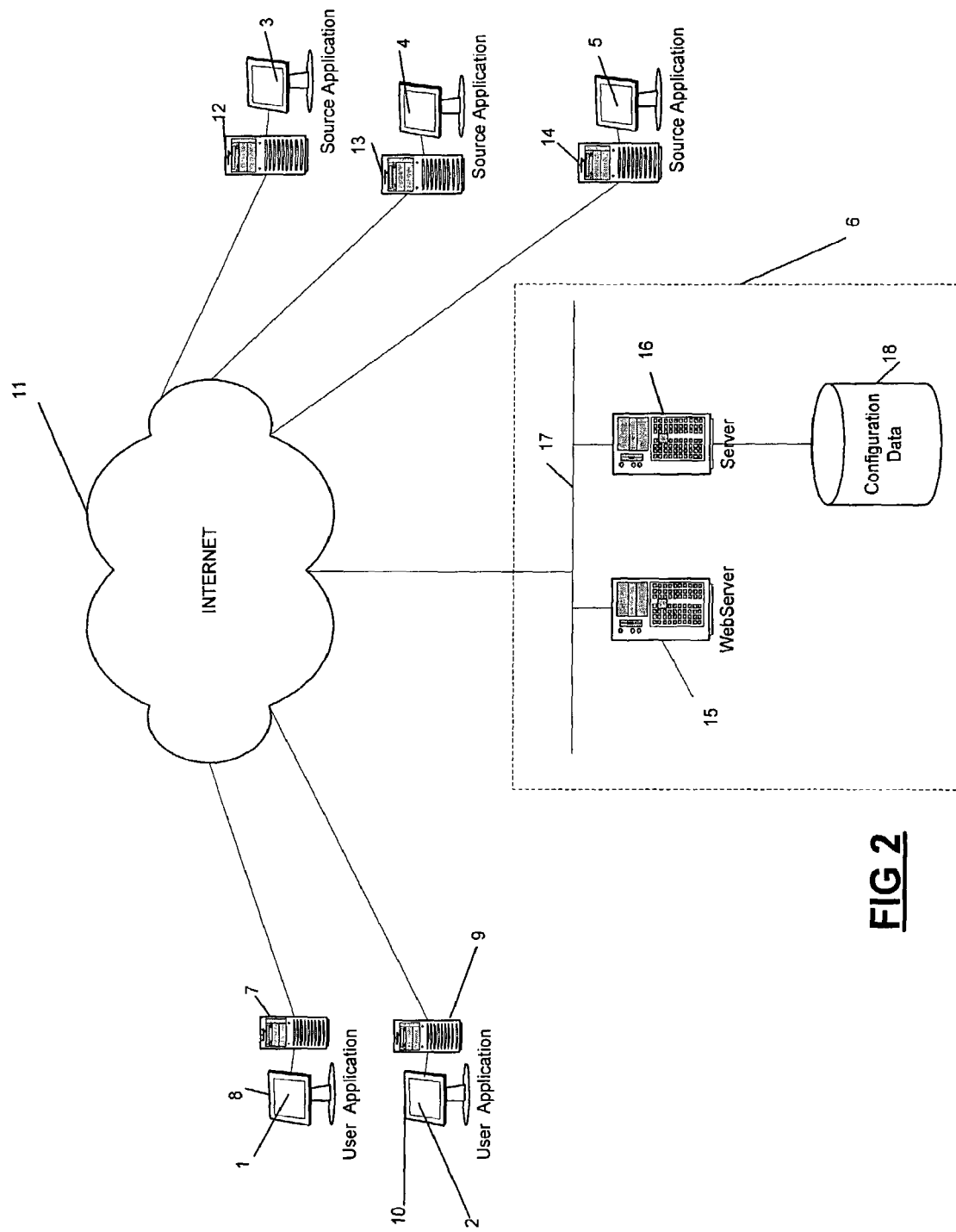
FIG. 2 is a schematic illustration showing a network of computers configured to implement the embodiment of the invention shown in FIG. 1.

FIG. 2 shows a network of computers configured to implement the embodiment of the invention described above with reference to FIG. 1. It can be seen that the user application 1 is provided to a user by means of a personal computer 7, having an associated display screen 8. Similarly, the user application 2 is provided to a user by means of a personal computer 9 having an associated display screen 10. The personal computers 7, 9 are of conventional configuration, and are provided with means to access the Internet 11. For example, the personal computers may be provided with interface cards allowing access to a local area network connected to the Internet 11, or alternatively may access the Internet 11 via modems either incorporated in or coupled to the personal computers 7, 9.

It can be seen from FIG. 2 that three servers 12, 13, 14 are also connected to the Internet 11. These servers can be connected to the Internet 11 using any appropriate means, including the connection means described above. It can be seen that the server 12 is configured to provide the source application 3, the server 13 is configured to provide the source application 4, and the server 14 is configured to provide the source application 5.

The composer 6, described above briefly with reference to FIG. 1, is also connected to the Internet 11. Again, the composer 6 can be connected to the Internet 11 via any suitable means. The composer 6 is shown in further detail in FIG. 2, and it can seen to comprise a webserver 15 and a backend server 16. The webserver 15 and the backend server 16 are connected together by a local area network (LAN) 17, which allows connection to the Internet 11. The LAN 17 is connected to the Internet 11 by any suitable means, and such means will be known to those skilled in the art. It can be seen that the backend server 16 is able to read data from and write data to a data store 18 which stores configuration data.

The webserver 15 is configured to provide access the user applications 1, 2 to the personal computers 7, 9 via the Internet 11. The user interfaces of the user applications 1, 2 are provided in the form of suitable HyperText Markup Language (HTML) files, which are provided by the webserver 15 and then interpreted by the personal computers 7, 9 using appropriate HTML interpreters (e.g. Microsoft™ Internet Explorer). The backend server 16 is configured to generate the HTML files representing the user interfaces. This generation can take a variety of different forms, and is controlled by the configuration data 18.

Generation of appropriate HTML is described in further detail below, although it should be noted that in general terms the source applications 3, 4, 5 also provide user interfaces in the form of HTML files, and the backend server 16 therefore obtains and manipulates HTML files from one or more of the source applications 3, 4, 5, so as to generate HTML files for the user applications 1, 2. Given that the source applications 3, 4, 5 will typically be configured such that links within provided HTML files will refer to other HTML files stored at a URL associated with one of the servers 12, 13, 14, it is necessary for the backend server 16 to amend such references so as to refer to the composer 6, such that a coherent user application is generated. Otherwise, an application would be generated in which, by selecting a link, a user could leave an application generated by the composer 6, and revert to simply using one of the source applications 3, 4, 5 directly. Processing is also required to ensure that dynamically generated references within HTML files are amended so as to refer to the composer 6. Again, this is described in further detail below.

Figure 3:
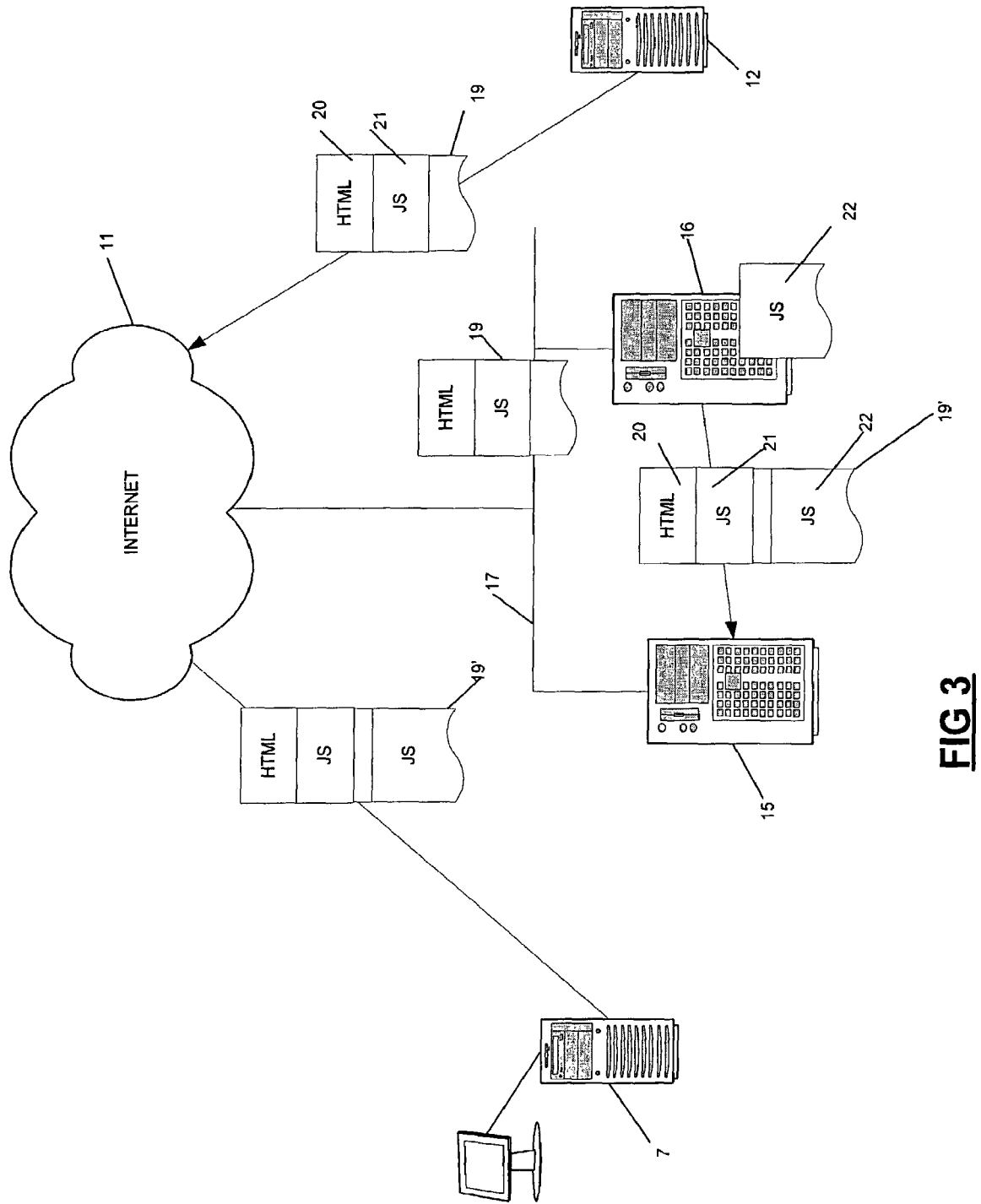
FIG. 3 is schematic illustration showing part of the network of FIG. 2 in further detail, and showing data which is transferred between computers of the network in an embodiment of the invention.

Referring now to FIG. 3, processing of a HTML file 19 forming part of the source application 3 and provided by the server 12 is described in further detail. It can be seen that the HTML file 19 comprises a first portion 20 comprising HTML instructions, and a second portion 21 comprising JavaScript commands. The HTML file 19 is passed from the server 12 via the Internet 11 and the LAN 17 to the backend server 16, as is schematically shown in FIG. 3. The backend server 16 is configured to carry out various processing on the HTML file 19. This includes both analysing and amending the HTML file 19 as is described below, and also the addition of further JavaScript 22 configured to control interpretation of the HTML file at the personal computer 7. This generates a modified HTML file 19'.

It should be noted that inclusion of the JavaScript 22 allows the composer 6 to work effectively where the HTML file 19 includes components which are altered dynamically. That is, where the HTML file 19 includes dynamic HTML (DHTML) components. Such components are such that references to other URLs may be generated on the fly during interpretation at the personal computer 7. In such cases, the composer 6 can of course not take action to modify such references so as to ensure that they are correctly rearranged to reflect modifications made to generate the user application 3. The use of the JavaScript 22 (which is executed at the personal computer 7) provides a mechanism for making modifications during interpretation of the HTML file 19 at the personal computer 7. That is it allows modifications to be made when DHTML elements are created or modified. Operation of the JavaScript 22 at the personal computer 7 is described in further detail below.

The HTML file, when suitably amended, and including the additional JavaScript 22 is passed from the backend server 16 to the webserver 15. Although shown schematically as a direct transfer in FIG. 3 for reasons of clarity, it will be appreciated that the modified HTML file 19' is passed from the backend server 16 to the webserver 15 via the LAN 17. The modified HTML file 19' is then passed to the personal computer 7 via the Internet 11.

Figure 4:
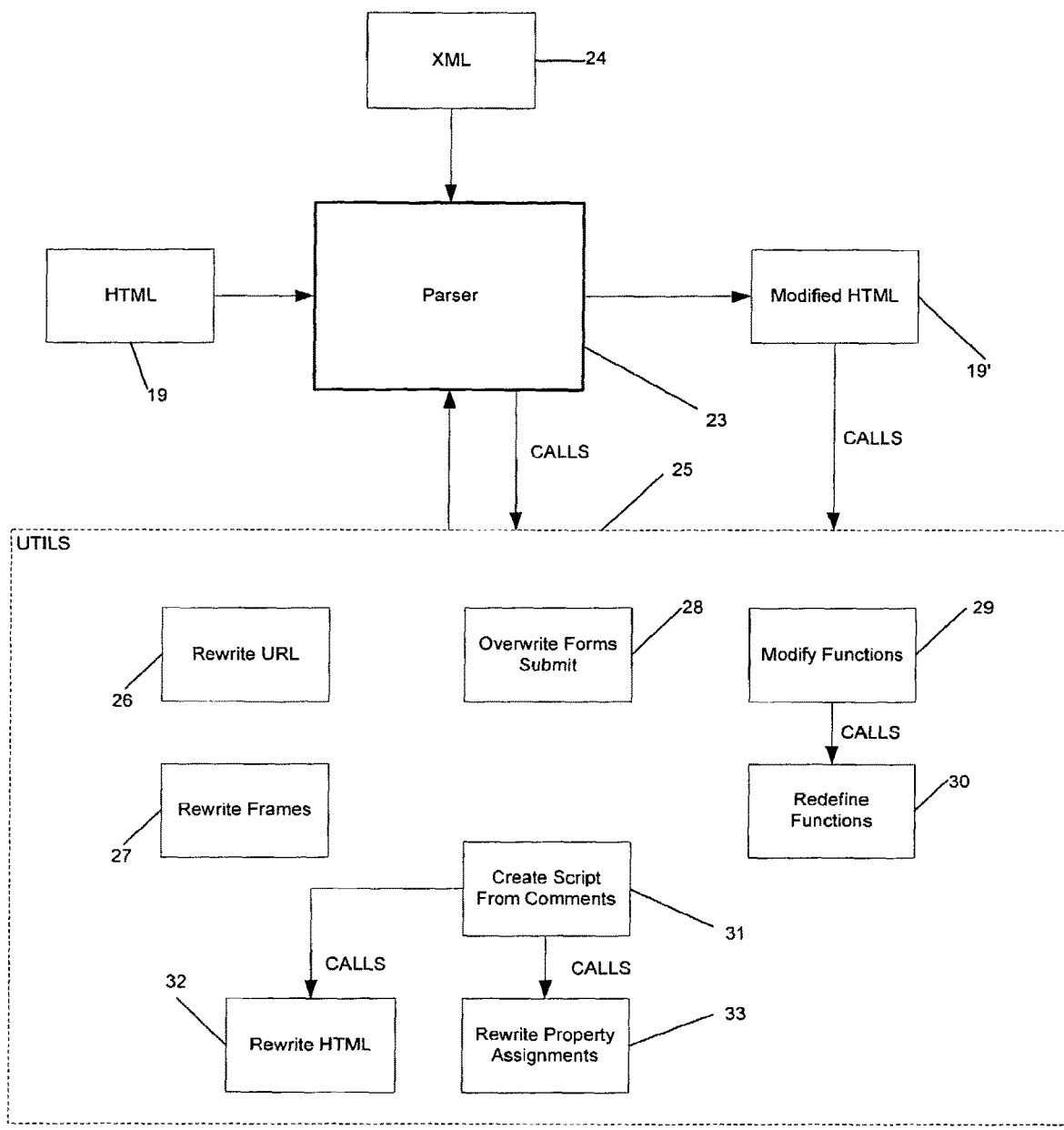
FIG. 4 is a block diagram of a software architecture used by a server connected to the network of FIG. 3.

Operation of the backend server 16 to cause modification of the HTML file 19 to generate the modified HTML file 19', is now described. FIG. 4 is a block diagram of software used by the backend server 16 to effect modification. The software operated by the backend server 16 comprises a parser 23 which is configured to process the HTML file 19, identifying and modifying statements within the HTML file in need of modification. Such statements are identified using an Extensible Markup Language (XML) file 24, which is stored in the datastore 18 shown in FIG. 2. It can be seen that the parser 23 also takes as input various utilities 25 which are used either to aid in the modification process carried out at the backend server 16, or alternatively used to provide code which is added to the HTML file 19 to generate the modified HTML file 19'.

The utilities 25 are now described in outline, although it is to be noted that their method is described in further detail below. The utilities comprise a number of methods which are called during operation of the parser 23, and some which are referenced from the modified HTML file 19'. It can be seen that some of the utilities 25 have relationships with one another. Each of the utilities is defined by computer program code written in the JavaScript programming language, and program code for the utilities is stored in a single JavaScript file. The JavaScript file is referenced both by the parser 23 and the modified HTML file 19'.

A rewriteURL method 26 is used by the parser 23 to rewrite URL references within the HTML file 19, to generate URL references for inclusion in the modified HTML file 19'. A rewriteFrames method 27 is used by the parser 23 to modify frames defined within the HTML file 19, to generate modified frames for inclusion in the modified HTML file 19'.

An overwriteFormsSubmit method 28 is referenced from the modified HTML file 19', and is therefore called by a computer interpreting the modified HTML file 19' to alter behaviour of the HTML code when form values are to be submitted. A modifyFunctions method 29 is similarly referenced by the modified HTML file 19', and the modifyFrames method 29 calls a redefineFunctions method 30 during its operation. Similarly a createScriptFromComments function 31 is referenced by the modified HTML file 19'. The createScriptFromComments function 31 calls a rewriteHTML function 32 and a rewritePropertyAssignments function 33.

Operation of the backend server is now described in further detail. First operation of the parser 23 in using the XML file 24 to recognise and modify elements of the HTML file 19 is described. In general terms, the XML file 24 comprises a plurality of regular expressions specifying particular HTML statements which require modification by the parser 23. For each of these regular expressions, the necessary modification is also specified.

Figure 5:
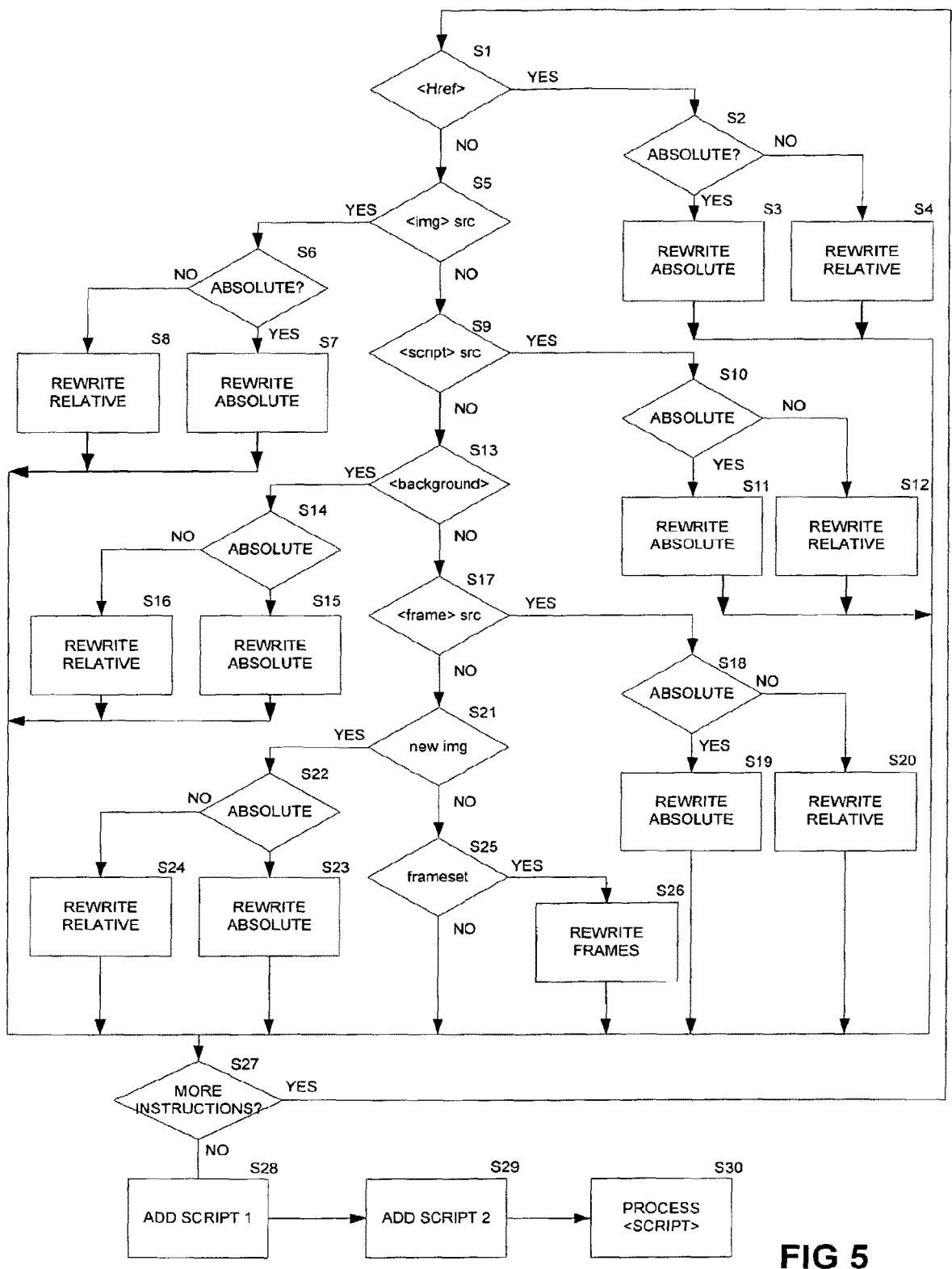
FIG. 5 is a flowchart showing processing carried out by a server connected to the network of FIG. 3.

The parser 23 evaluates each of the regular expressions of the XML file 24 for each statement of the HTML file 19 in turn. This process is illustrated in FIG. 5. At step S1 a regular expression configured to identify HTML href statements, which indicate links, is evaluated. All such references are modified so as to be directed to the composer 6. Therefore, if the regular expression is satisfied at step S1, processing passes to step S2. Redirection is carried out differently, depending upon whether the identified href is an absolute reference or a reference specified relative to the processed HTML file 19. Absolute and relative references are differentiated by at step S2. If the identified reference is an absolute reference, processing passes to step S3, where it is rewritten in accordance with rules specified in the XML file 24. Typically, these rules will be configured for a particular application so as to rewrite all absolute references associated with that application so as to refer to a location under a particular base URL associated with the webserver 15 of the composer. This is conveniently achieved by specifying variables unique to a particular application, identifying the base location of the webserver 15 with which that application is to be associated.

It can be seen that if the check of step S2 determines that the located reference is not an absolute reference, processing passes to step S4, where it is appropriately rewritten, again by use of appropriately configured variables, which in this case take into account the relative nature of the specified reference.

If the regular expression is not satisfied at step S1, processing passes directly to step S5 where a regular expression configured to identify <img> tags is evaluated. If the regular expression is satisfied, processing then passes to step S6, where processing is initiated to replace an image reference associated with the <img> tag. The reference will be replaced with a reference associated with the composer 6. Step S6 determines whether the located reference is an absolute or relative reference. Absolute references are rewritten at step S7, while relative references are rewritten at step S8. The reference rewriting carried out by steps S7 and S8 is analogous to that carried out at steps S3 and S4 and described above.

If the regular expression is not satisfied at step S5, processing passes directed to step S9 where a regular expression configured to identify script source statements of the form "<script> src=" is evaluated. If this regular expression is satisfied, processing moves to step S10 where script sources specified using absolute URLs are differentiated from script sources specified using relative URLs. Absolute references are rewritten at step S11, while relative references are rewritten at step S12.

If the regular expression of step S9 is not satisfied, processing passes to step S13 where a regular expression configured to identify <background> tags is evaluated. URLs referenced by such tags need to be rewritten so as to be directed to the composer 6, in the manner described above. If the regular expression of step S13 is satisfied, processing passes to step S14, where absolute URLs are differentiated from relative URLs. Absolute URLs are rewritten at step S15, while relatively specified URLs are rewritten at step S16.

If the regular expression of step S13 is not satisfied, processing passes to step S17, where a regular expression configured to identify frame source statements is evaluated. More specifically, the regular expression of step S17 is configured to identify statements of the form "<frame> src=". If the regular expression of step S17 is satisfied, the URL referenced by the frame is amended by the processing of steps S18, S19 and S20. At step S18 a check is carried out to determine whether the referenced URL is specified in absolute or relative terms. If the URL is specified in absolute terms, processing passes to step S19 where the URL is amended. Otherwise, processing passes to step S20 where the URL is amended.

If the regular expression of step S17 is not satisfied, processing passes to step S21, where a regular expression configured to identify statements indicating dynamically loaded images is evaluated. If the regular expression of step S21 is satisfied, processing passes to step S22, where a check is carried out to determine whether the referenced URL is specified in absolute or relative terms. If the URL is specified absolutely, processing passes to step S23 where the URL is amended. Otherwise processing passes to step S24 where the URL is amended.

If the processed statement has failed to satisfy the regular expression of step S21 (and therefore also the regular expressions of steps S1, S5, S9, S13 and S17), processing passes to step S25. At step S25 a regular expression is evaluated which is configured to identify onLoad methods associated with a <frameset> tag. If this regular expression is satisfied, processing passes to step S26 where appropriate modifications are made by the rewriteFrames method 27. Operation of the rewriteFrames method is described in further detail below.

If none of the regular expressions shown in FIG. 5 are satisfied, processing passes to step S27. In such a case it can be concluded that the processed statement does not require modification. Processing similarly passes to step S27 after modifications have been made from each of steps S3, S4, S7, S8, S11, S12, S15, S16, S19, S20, S23, S24 and S26.

At step S27, a check is carried out to determine whether there remain further instructions in the HTML file 19 which need to be processed. If any such instructions remain, processing returns to step S1, otherwise processing passes to step S28, where a reference to a first JavaScript is added to the HTML file 19. This first JavaScript is added before the first <frameset> tag within the HTML file 19, that is, it is added at the beginning of the HTML file 19. Operation of this JavaScript is described in further detail below.

From step S28, processing passes to step S29, where reference to a second JavaScript is added to the HTML file 19, here the reference is added the very end of the HTML file 19, that is, directly before the </html> tag. Again, operation of this JavaScript is described in further detail below.

Finally, processing passes from step S29 to step S30. At step S30 all <script> tags specifying particular JavaScript code are modified, and again, this modification is described in further detail below.

In the preceding description it was indicated that the processing of rewriteFrames method denoted by step S26 of FIG. 5 would be described in further detail. This description is now presented. In general terms, the rewriteFrames method 27 is called when a <frameset> tag is encountered. The method is configured to process each frame of the HTML file 19 in turn, and to overwrite reload and replace methods associated with each frame. Specifically, these methods are amended so as to refer to the composer 6. Each frame is processed in turn, and each processed frame is marked to indicate that processing has taken place. The function operates recursively, so as to ensure that all subframes are correctly amended.

Figure 6:
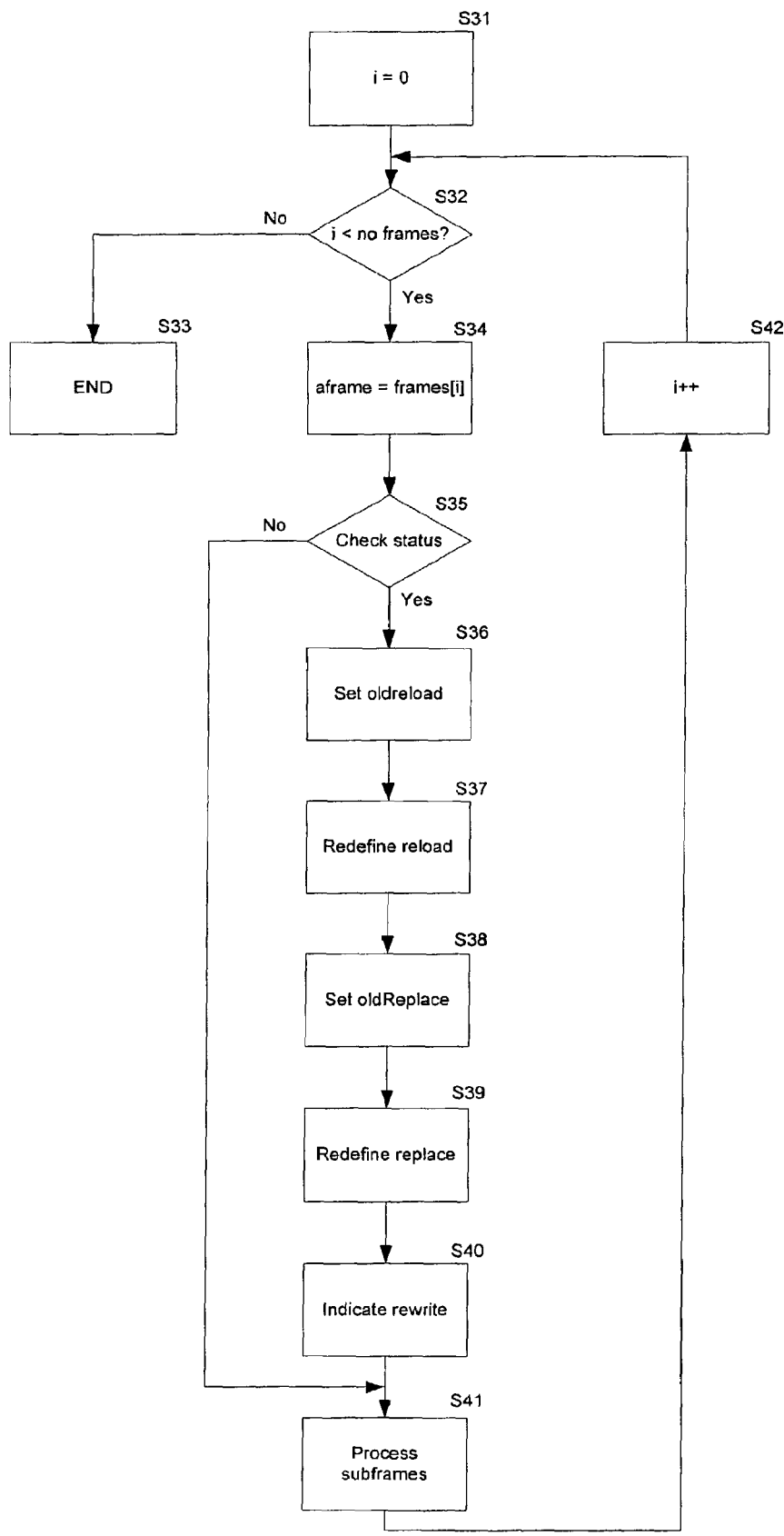
FIG. 6 is a flowchart showing part of the processing of FIG. 5 in further detail.

Processing carried out by the rewriteFrames method 27 is now described in further detail with reference to FIG. 6. At step S31 a counter variable is initialised to a value of 0. At step S32 the number of top-level frames defined within the HTML file 19 is determined by examining the frames.length variable, frames being an array of all frames defined within the HTML file 19. Step S32 also checks that the value of the counter variable is less than the determined number of frames. If this check is not satisfied, processing ends at step S33. Otherwise, processing passes to step S34 where an aFrame variable is set to be the frame object contained at the index of the frames array indicated by the counter variable. At step S35 a check is made to ensure that the frame object associated with the aFrame variable is properly defined, and also that the frame object associated with the aFrame variable has not previously been rewritten. Assuming that this check is successful, processing passes to step S36 where the current reload method (i.e. the reload method of the aFrame object) is assigned to an oldReload variable of the aFrame object. At step S37, the reload method is associated with a newly defined reload method. The newly defined reload method is configured so as to operate using a redefined URL, reflecting operation of the composer 6. Redefinition of the reload method may comprise defining the reload method to be the method now associated with the oldReload variable, called with an appropriately rewritten URL. However, it should be noted that in some circumstances the reload method is called without a URL parameter, in which case it has the effect of reloading the current page. In such a case, the new reload method can be defined using a URL based upon an appropriate rewriting of this.href.

At step S38, a variable oldReplace of the aFrame object is set to be the currently defined replace method, while at step S39 a new replace method is defined. The new replace method is defined by calling the oldReplace method with a reconfigured URL, the URL being reconfigured to reflect operation of the composer 6. At step S40 a variable rewritten associated with the aFrame object is set to true, so as to indicate that its methods have been updated.

Having updated all methods associated with the currently processed frame, at step S41, subframes associated with the currently processed frame are processed, by making a recursive call to rewriteFrames. Having completed processing of step S41 (i.e. having processed all sub-frames), the counter variable is incremented at step S42, and processing then returns to step S32.

In various parts of the preceding description reference has been made to modification of URL references. This is handled either by commands within the XML file 24 or by the rewriteURL method 26. The manner in which URL references are amended is dependent upon the type of URL. Specifically, URL references are rewritten as either proxy or passthrough URLs. Proxy URLs are used where the composer 6 is to act as a proxy server between the personal computer 7 and the server 12. Passthrough URLs are used where the composer 6 is to take no action other than pass the request onto the server 12. These different URL types are differentiated by use of keywords PROXY and PASS-THROUGH within their specification. The composer 6 is then configured to recognise these keywords in specified URLs, and take appropriate action. It should be noted that in general image and style sheet references (e.g. URLs ending with file extensions.gif, .jpg and .css) are rewritten as proxy URLs, while all other URLs are rewritten as passthrough URLs.

It has been described above, that at steps S28 and S29 of FIG. 5, references to JavaScripts are added to the HTML file 19. Detail of the first JavaScript referenced at step S28 is now presented. This reference refers to the modifyFunctions method 29, operation of which is described below. It should be noted that the modifyFunctions method 29 operates to modify functions defined within the HTML file 19, during its execution at the personal computer 7. The call to the modify functions method is added at the head of the HTML file, so as to ensure that the call is made, and function modifications take place, before any functions are called.

Figure 7:
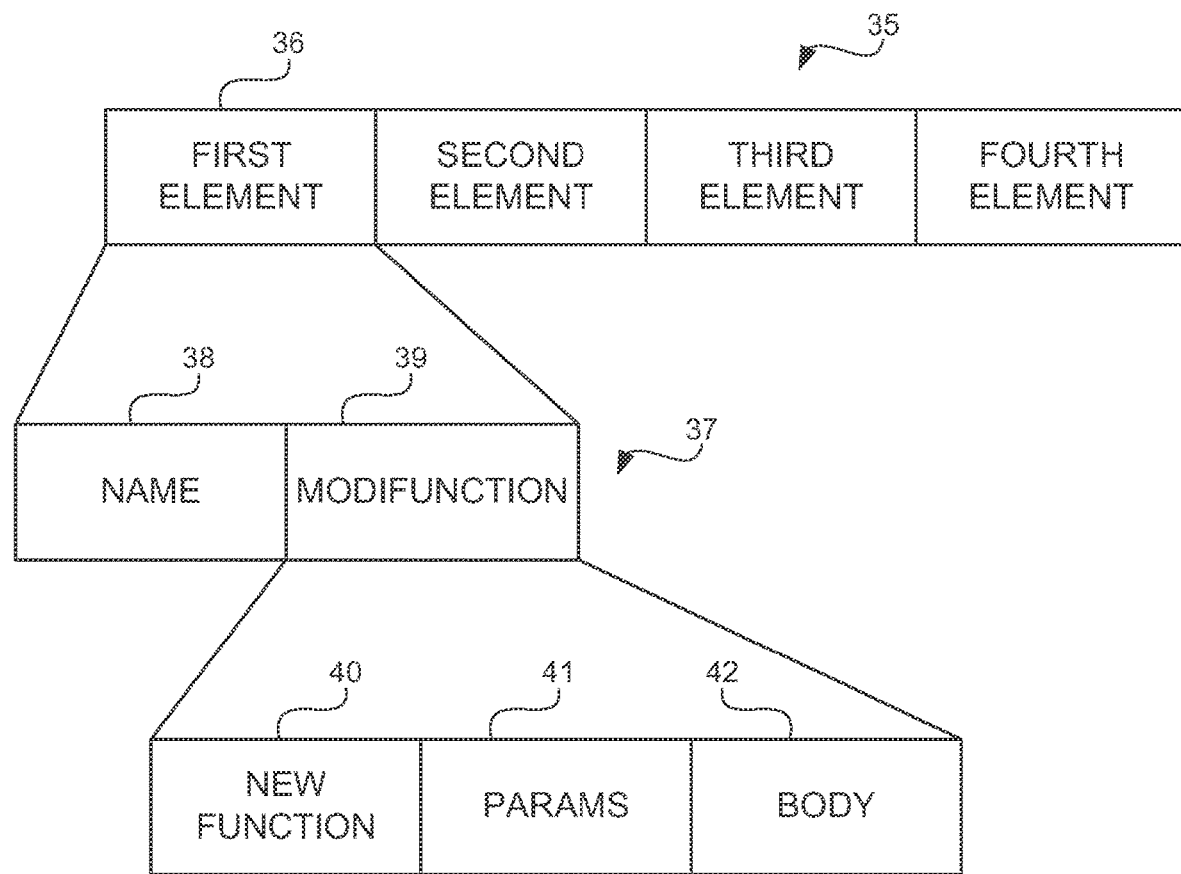
FIG. 7 is a schematic illustration of an array of functions which are manipulated in an embodiment of the present invention.

The modifyFunctions method 29 uses an array 35, shown in FIG. 7, during its operation. It can be seen that an array 35 comprises four elements, each having a similar format. The format of a first element 36 of the array 35 is shown in further detail in FIG. 7 by way of example. The first element 36 is itself a two element array 37. The array 37 comprises a first element 38 which indicates a name of a function which is to be modified, and a second element 39 which defines a function which is configured to carry out the modification. The second element 39 which defines the modification function is a text string being a JavaScript statement defining the modification function. It can be seen that this text string comprises three distinct parts: a first part 40 which is a JavaScript statement indicating that a function is being defined, a second part 41 defining parameters which the function is to take, and a third part 42 defining the body of the defined function. Use of the data shown in FIG. 7 during operation of the modifyFunctions method 29 is now described with reference to FIG. 8. It is assumed that the array 35 shown in FIG. 7 has been appropriately defined prior to the modfiyFunctions method being called.

Figure 8:
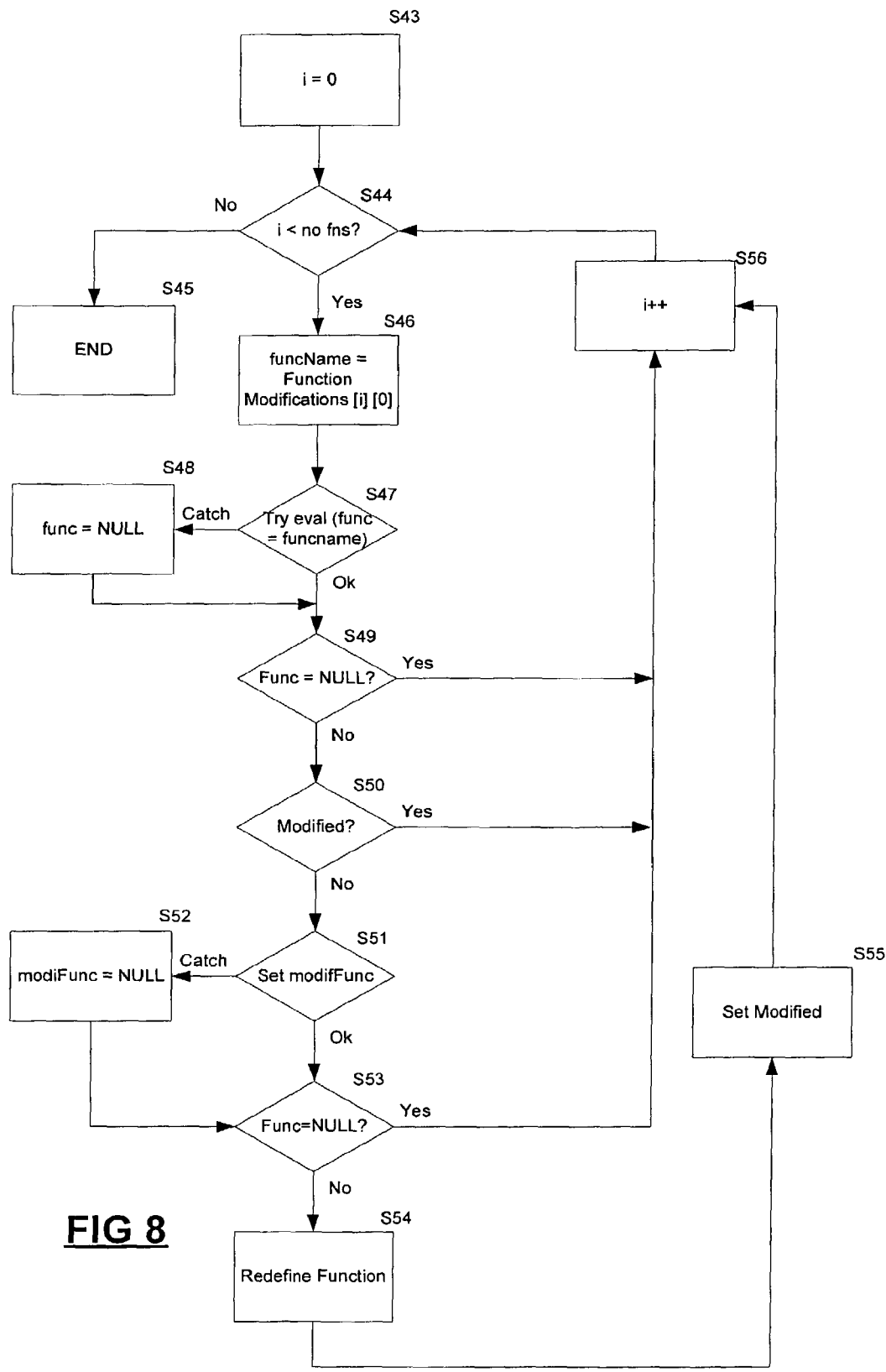
FIG. 8 is a flowchart of a method configured to modify operation of computer program code.

Referring to FIG. 8, at step S43, a counter variable is initialised to zero. This counter variable is to count through elements of the array 35 as is described below. At step S44 the number of elements within the array 35 is determined, and a check is made to determine whether the counter variable has a value which is less than this number of elements. If this check is not satisfied, processing ends at step S45. Otherwise processing continues at step S46. At step S46 a variable funcName is set to be the function name to be modified, as indicated by the element of the array 35 denoted by the value of the counter variable. Step S47 attempts to evaluate the function indicated by the funcName variable. This ensures that the function actually exists, and assigns the function to a variable func. This check is carried out using a try . . . catch statement, configured to catch any exception thrown by the evaluation. If an exception is thrown, processing passes to step S48 where a func variable is set to NULL. If the evaluation is successful, processing continues at step S49 where a check is made to ensure that the func variable is not set to NULL (which could be as a result of operation of step S48 or other reasons). Assuming that this check is successful, processing continues at step S50, where a check is made to determine that the function indicated by the func variable has not already been modified. Assuming that this check is also successful, processing passes to step S51.

At step S51 a variable modifFunc is set to be the function defined by the second element of the array stored at the element of the array 35 indicated by the counter variable. If this assignment is unsuccessful, an exception is thrown which is caught at step S52, where modifFunc is set to NULL. Otherwise, processing continues at step S53, where a check is made to ensure that modifFunc is not set to NULL. Assuming that this check is successful, processing passes to step S54 where the function indicated by the variable func is redefined using the modification function indicated by the variable modifFunc. This redefinition uses a method named redefineFunction, operation of which is described below.

Having carried out appropriate redefinition at step S54, processing passes to step S55 where a variable is updated within the appropriate element of the array 35 to indicate that the function has been modified. The counter variable is incremented at step S56, and processing then returns to step S44. It should be noted that if any of the cheeks of step S49, S50 or S53 described above are not satisfied, processing passes directly from the respective step to step S56.

Figure 9:
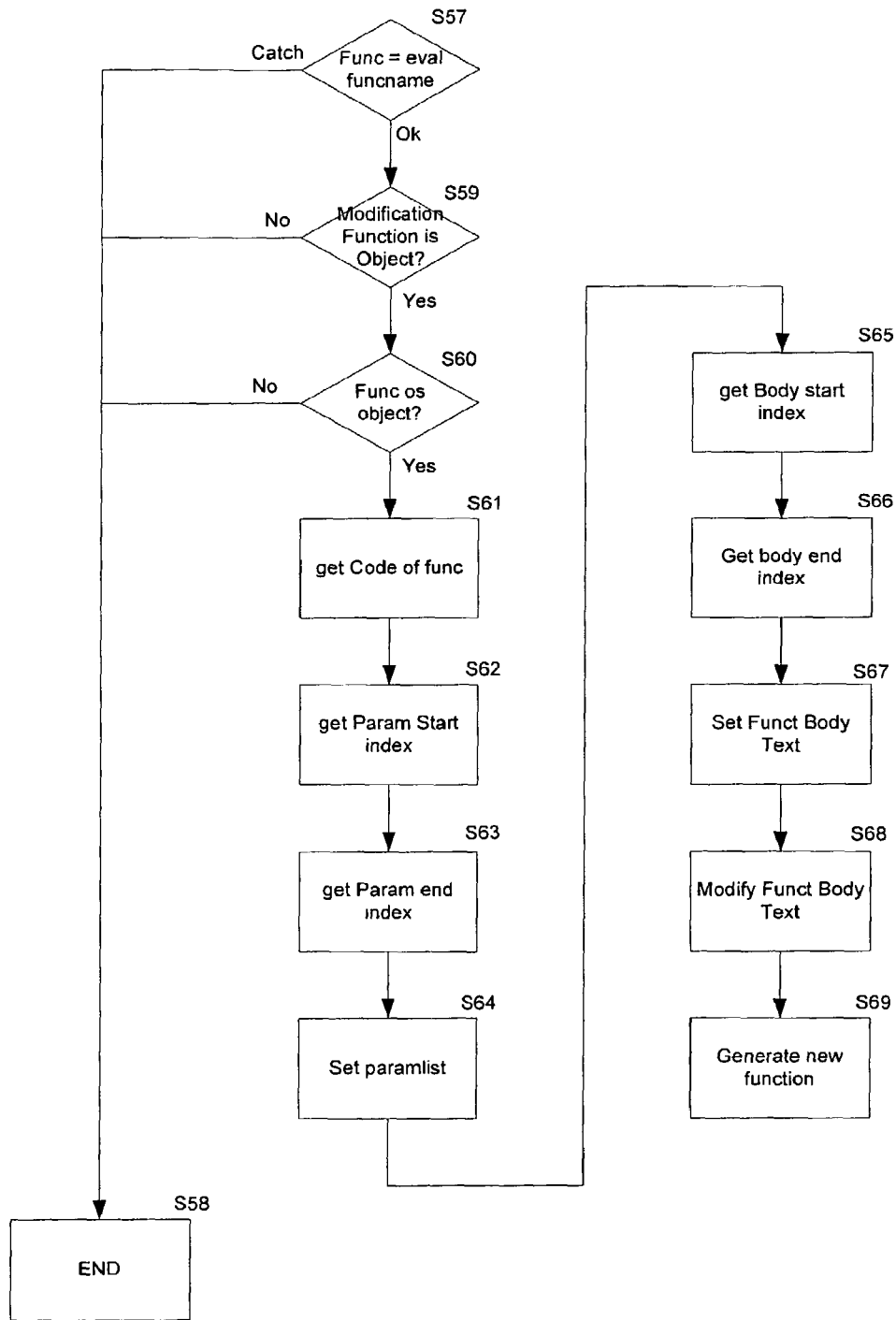
FIG. 9 is a flowchart of a method called from the method shown in FIG. 8.

Operation of the redefineFunction method called from the modifyFunctions method described above, is now described with reference to FIG. 9. The redefineFunction method is called with two parameters, a funcName parameter indicating the name of the function to be redefined, and a modificationFunction parameter, indicating a function configured to carry out the redefinition. At step S57 the function indicated by the supplied function name funcName is evaluated and assigned to a variable func. If this assignment is unsuccessful, resulting in an exception being thrown, processing passes from step S57 to step S58 where processing ends. Otherwise, processing passes from step S57 to step S59 where a check is made to ensure that the provided moficiationFunction is an object. A similar check is made to ensure that func is also an object (step S60). If the check of either step S59 or step S60 is not satisfied, processing again ends at step S58, otherwise, processing continues at step S61.

At step S61, the code of the function to be modified, indicated by the func variable is obtained. This is achieved by converting the entire function into a string, which can be manipulated by the redefineFunction method. Steps S62 and S63 manipulate the generated string to determine indices of the string at which the parameter list of function begins and ends. Having determined these indices, step S64 then generates a string consisting of the parameters of the function, by generating a sub-string of the string representing the entire function.

Steps S65, S66 and S67 carry out similar processing. Specifically, steps S65 and S66 respectively identify indices within the string defining the function at which the body of the function begins and ends. At step S67 a sub-string based upon these indices is generated. Having obtained this string, modificationFunction (i.e. a method configured to carry out modification to the body of function being modified) is called with the body text string as a parameter. This results in generation of the modified function body text at step S68. The function is then refined using the new body text at step S69.

From the preceding description, it can be seen that by adding a call to modifyFunctions to the HTML file 19, and by ensuring that an array of such modifications is also correctly referenced, functions defined within the HTML file 19 can be modified at run time at the personal computer 7. More specifically, the modifyFunctions method is positioned towards the top of the HTML file 19, and appropriate functions are redefined within the execution context, before they are called. Thus, the modifyFunctions method ensures that modifications necessary to effect generation of the user application 3 are made.

Referring to FIG. 5, the JavaScript reference added to the HTML file at step S29 is now described. This is a reference to the overwriteFormsSubmit method 28 shown in FIG. 4. This method is configured to be executed at the personal computer 7 to overwrite the submit method associated with any forms within the HTML file 19. Thus, the overwriteFormsSubmit method 28 provides a convenient mechanism for ensuring that each submit method associated with any form within the HTML file 19 is redefined to reflect operation of the composer 6.

It should be noted the overwriteFormsSubmit is added at the end of the processed HTML file to ensure all appropriate objects are modified. This is because a browser will typically process a HTML file, and this processing will generate various objects (e.g. DOM objects, scripts etc). Thus, if the overwriteFormsSubmit method is called before form objects have been created, objects requiring modification may not yet have been created, and accordingly cannot be appropriately modified.

Figure 10:
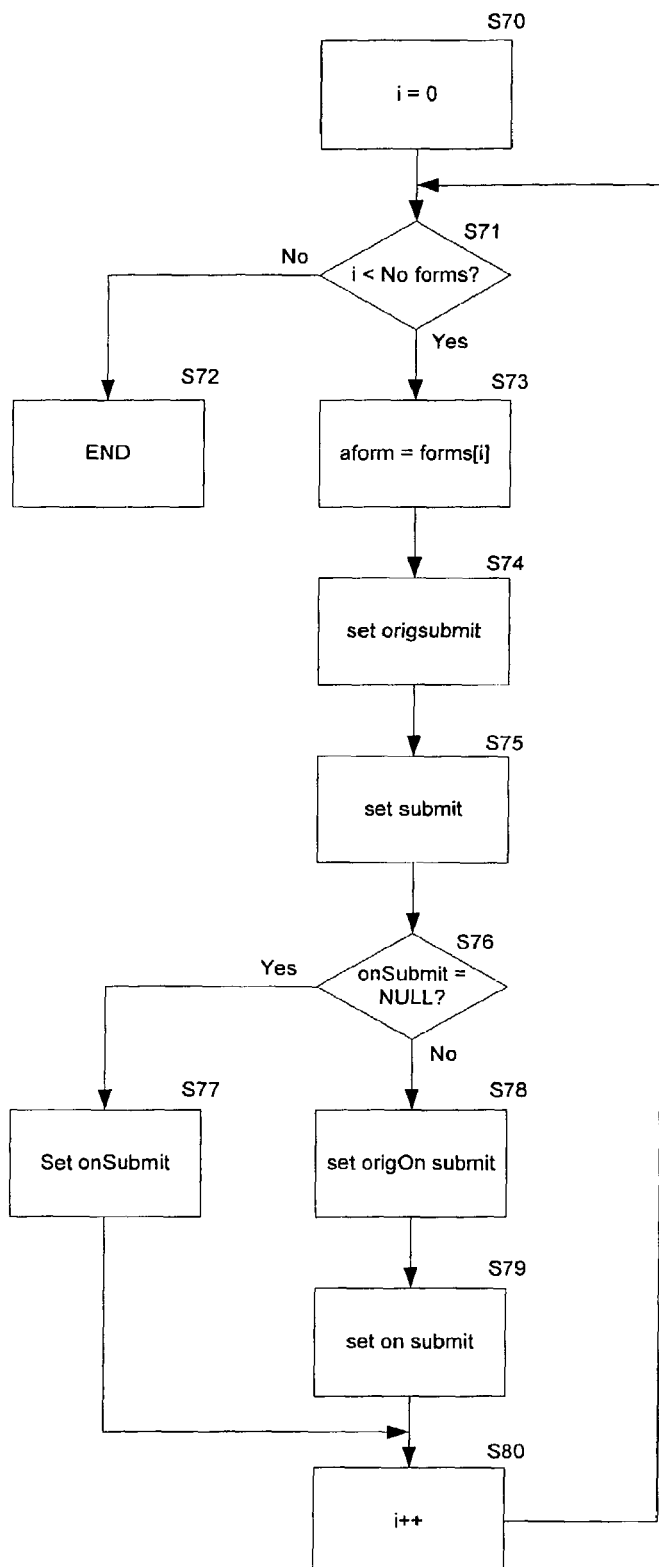
FIG. 10 is a flowchart of a method to which reference is added in existing computer program code at the server of FIG. 3, for execution at a client.

Operation of the overwriteFormsSubmit method 28 is now described with reference to FIG. 10. At step S70, a counter variable is initialised. This counter variable is to count through each form within the HTML file 19, as described below. At step S71 the number of forms within the HTML file 19 is determined, and a check is carried out to ensure that the counter variable value is less than the number of forms. If this check is not successful, processing ends at step S72. Otherwise processing continues at step S73 where an array of forms within the HTML file 19 is interrogated to obtain the form at the index of that array indicated by the counter variable. This obtained form is assigned to a variable aform. At step S74, the submit method associated with the form assigned to the variable aform is assigned to a variable origSubmit associated with the variable aform. At step S75, the submit method is redefined by amending the URL to which data is to be submitted, to reflect operation of the composer 6. Steps S76 to S79 are concerned with redefinition of the onSubmit handler function associated with the form associated with the aform variable. At step S76 a check is made to determine whether an onSubmit method is currently defined. If no such method is currently defined, a handler is defined at step S77. If however an onSubmit method is currently defined, processing passes to step S78 where an origOnSubmit variable is used to store the value of the current handler. Step S79 then redefines the onSubmit handler so as to reflect operation of the composer 6. It should be noted that steps S77 and S79 are configured so as to redefine the handler function so as to modify the URL to which data is submitted, to reflect operation of the composer 6. Having made appropriate modifications at either step S77 or S79, the counter variable is incremented at step S80, and processing then returns to step S71.

Figure 11:
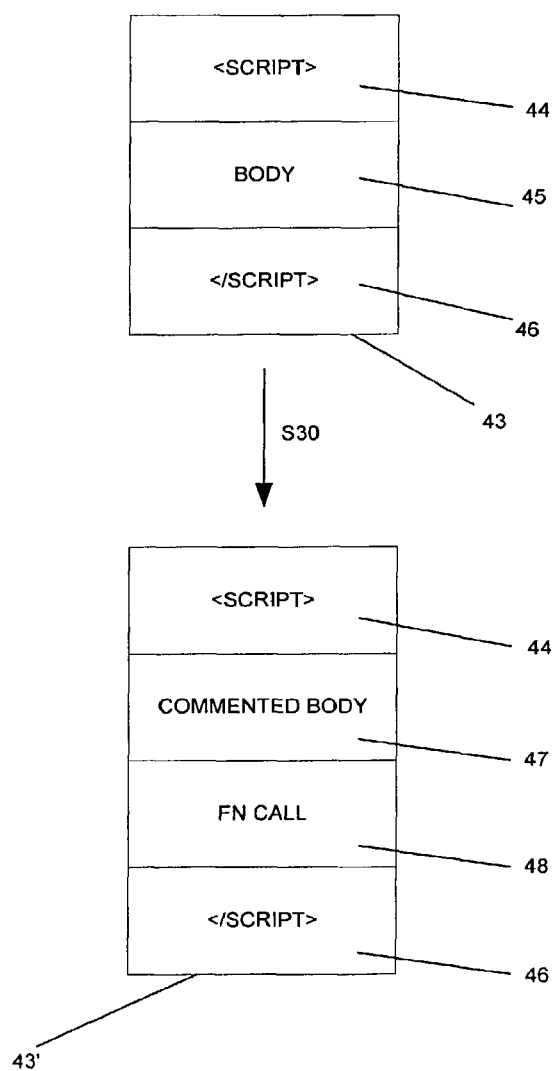
FIG. 11 is a schematic illustration of processing carried out at the server of FIG. 3, to affect operation of scripts at a client.

Referring back to FIG. 5, at step S30, <script> statements defining scripts are processed. This processing is now described in further detail with reference to FIGS. 11 and 12. FIG. 11 provides a schematic overview of the processing carried out. It can be seen that a block of code 43 which defines a script comprises three components. A <script> tag 44 indicating the beginning of the script definition, a body portion 45 which contains JavaScript statements defining the script and a </script> tag 46 which indicates the end of the script definition. The processing carried out by step S30 modifies the block of code 43 to define a modified block of code 43'. It can be seen that the modified block of code 43' comprises unmodified <script> and </script> tags 44, 46. However the modified block of code 43' comprises a commented body portion 47, which is the body portion 45 of the block of code 44, prefixed (and possibly suffixed) by appropriate comment characters so as to prevent its execution. The modified block of code 43' also comprises a function call 48 directed to a createScriptFromComments method, which is configured to process the commented body portion 47, to generate a modified script body as described below.

Thus step S30 of FIG. 5 processes <script> statements within the HTML file 19, so as to perform modification as shown in FIG. 11. This processing allows scripts to be modified by the personal computer 7 at runtime, by execution of the createScriptFromComments method.

Figure 12:
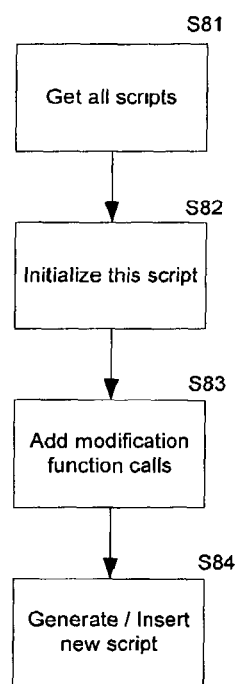
FIG. 12 is a flowchart of a method called at the client configured to work alongside the processing shown in FIG. 11.

Operation of the createScriptFromComments method is now described, with reference to FIG. 12. At step S81, all scripts within the HTML document are identified, and obtained within an array. It can be determined that the script of interest will be at the highest defined element of the array, and this script is obtained at step S82. The obtained script is then processed, removing comment characters from each line of the script in turn. For each line of the script which is processed (although it should be noted that some scripts requiring modification may be spread over more than one line), assignment expressions for some objects (e.g. JavaScript objects) are modified by inserting appropriate function calls which will execute when the modified script is executed. The modified expressions can be static strings, or can alternatively be JavaScript expressions which evaluate to provide URLs and HTML statements. This is carried out at step S83. Again, modification of the HTML and URLs is carried out to reflect operation of the composer 6. This modification involves calling the rewritePropertyAssignments method 33 twice. A first call adds a call to the rewriteURL method 26, while a second call of the rewritePropertyAssignments method 33 adds a call to the rewriteHTML method 32. The rewriteURL method 26 and the rewriteHTML method 32 are then called during execution of the script. The modified script is generated, and incorporated into the HTML file at step S85.

Figure 13:
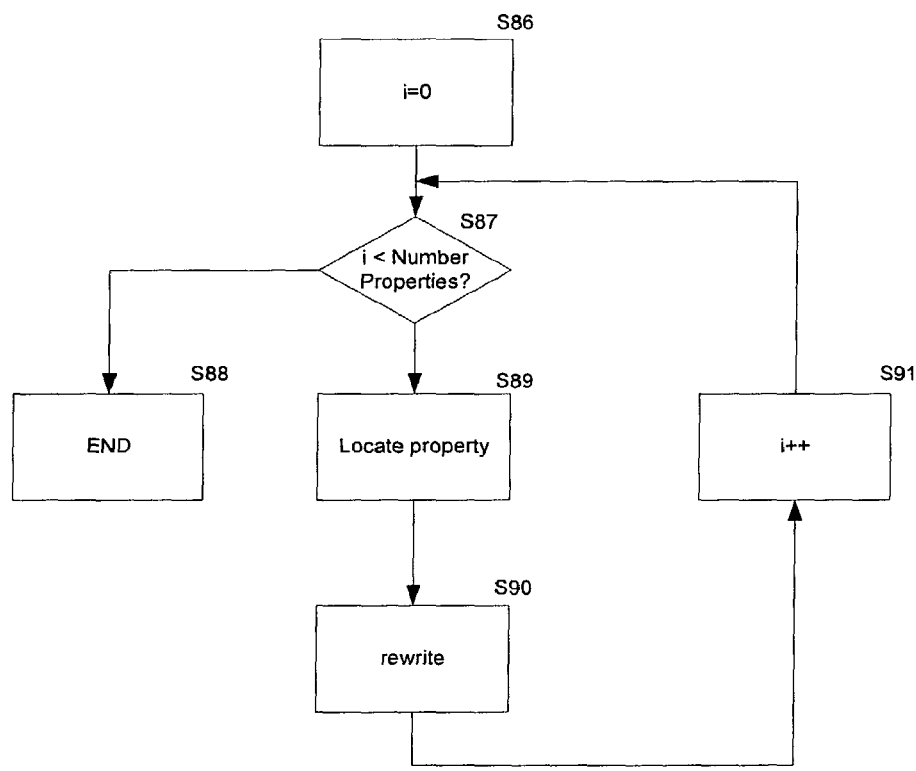
FIG. 13 is a flowchart of a method called from the method shown in FIG. 12.

FIG. 13 is a flowchart outlining operation of the rewritePropertyAssignments method 33. This method takes three parameters: a first parameter indicating a script to be modified in the form of string of JavaScript defining the script, a second parameter being an array of properties which are to be rewritten, and a third parameter which is a function configured to perform modification.

Referring to FIG. 13, at step S86 a counter variable which is to count through elements of the properties array is initialised. At step S87 a check is made to ensure that the value of the counter variable is less than the number of elements within the properties array. If this check is not satisfied, processing passes to step S88 and terminates. Otherwise processing continues at step S89 where the property to be located is located within the text of the script passed as a parameter. Having located the property, appropriate modification is carried out at step S90, by calling an appropriate function. The counter variable is then incremented at step S91, and processing then returns to step S86.

Figure 14A:
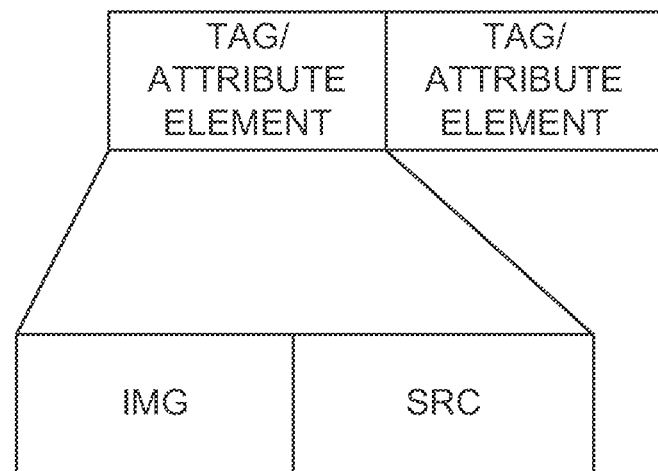
FIG. 14A is a schematic illustration of an array of tags and attributes.
Figure 14B:
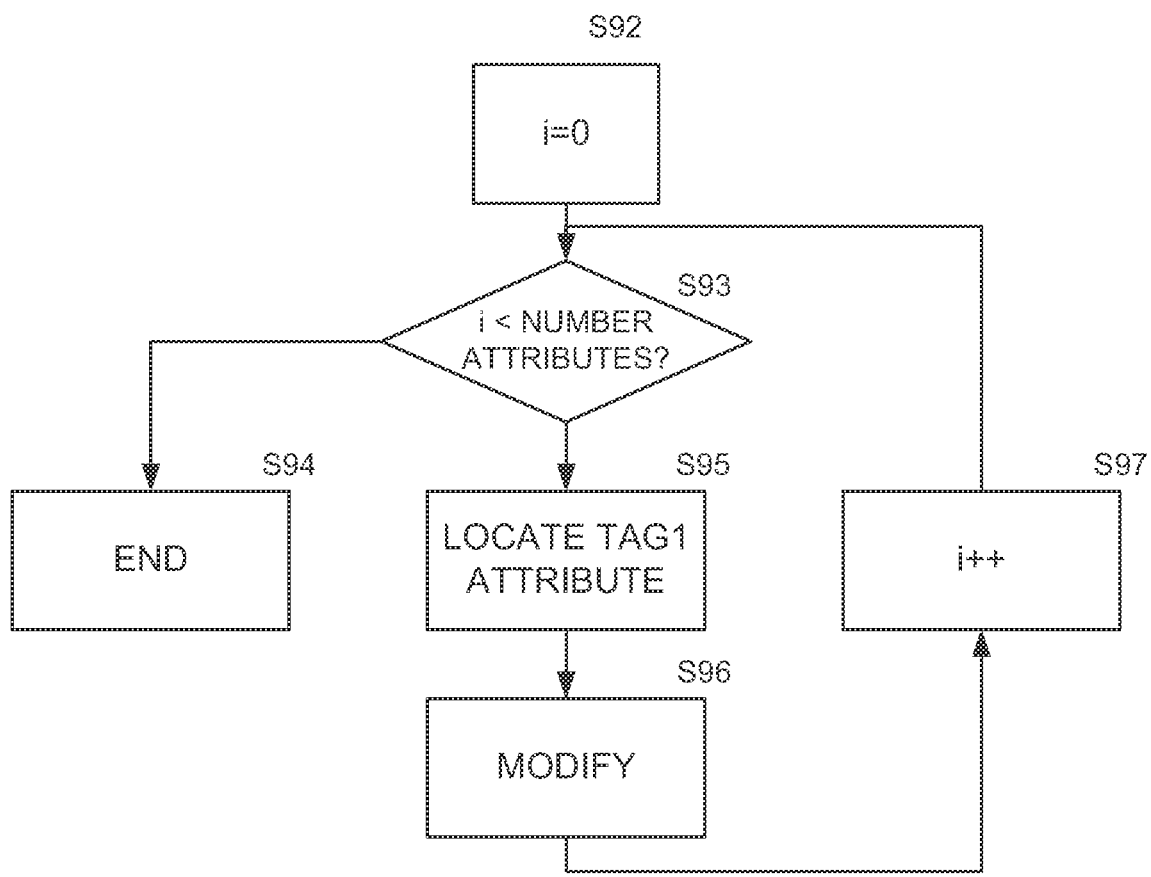
FIG. 14B is a flowchart of a method called from the method shown in FIG. 12, which operates using the array of FIG. 14A.

FIG. 14A shows an array which is used by the rewriteHTML method, which is shown in FIG. 14B. The rewriteHTML method is configured to modify particular tag/attributes combinations within particular HTML statements. That is, a property to be modified may be used by an innerHTML statement. Having identified such a property, the rewritePropertyAssignments method calls the rewriteHTML method to rewrite particular tag/attribute combinations with that innerHTML statement. Tag/attribute combinations which are to be modified are specified by an array of the form shown in FIG. 14A, each element of which is a two element array, a first element specifying a tag and a second element specifying an attribute. It can therefore be seen that the first element of the array of FIG. 14A specifies the src attribute of the img tag.

For example, an original script:

```
a = "<img src='http://x.com'>"
element.innerHHML = a
x.src = http://y.com
``` would be rewritten to be:

```
a = "<img src='http://x.com'>"
element.innerHHML = rewriteHTML(a)
x.src = rewriteURL(http://y.com)
```

Referring now to FIG. 14B, operation of the rewriteHTML method is described. At step S92 a counter variable which is to count through the elements of the array of FIG. 14A is initialised. At step S93 a check is made to ensure that the counter variable value is less than the number of elements within the array of FIG. 14A. If the check of step S93 is not satisfied, processing ends at step S94. Otherwise, processing passes to step S95 where the tag/attribute combination indicated by the element of the array of FIG. 14A indicated by counter variable is located, and the located tag/attribute combination is modified at step S96. The counter variable is incremented at step S97, and processing then returns to step S93.

Thus, it should be noted that createScriptFromComments allows a script to be provided to the personal computer 7 in the form of a comment, and modified prior to execution at the personal computer 7 to reflect operation of the composer 6.

It should be noted that although considerable detail relating to the way in which the createScriptFromComments method operates has been presented above, in general terms, all that is required is that a method is provided which can execute at the personal computer 7 to process commented text having within it a script, to modify that script prior to execution at the personal computer 7. It will be appreciated that there are a large number of ways in which this can be achieved.

The preceding description has been concerned with an embodiment of the invention in which a HTML file 19 is modified at the composer 6 to generate a modified HTML file 19'. The modified HTML file 19' is partially modified to reflect operation of the composer 6. However other modifications are carried out by function calls which are inserted into the modified HTML file 19', and which are configured so as to carry out modifications at runtime.

Figure 15:
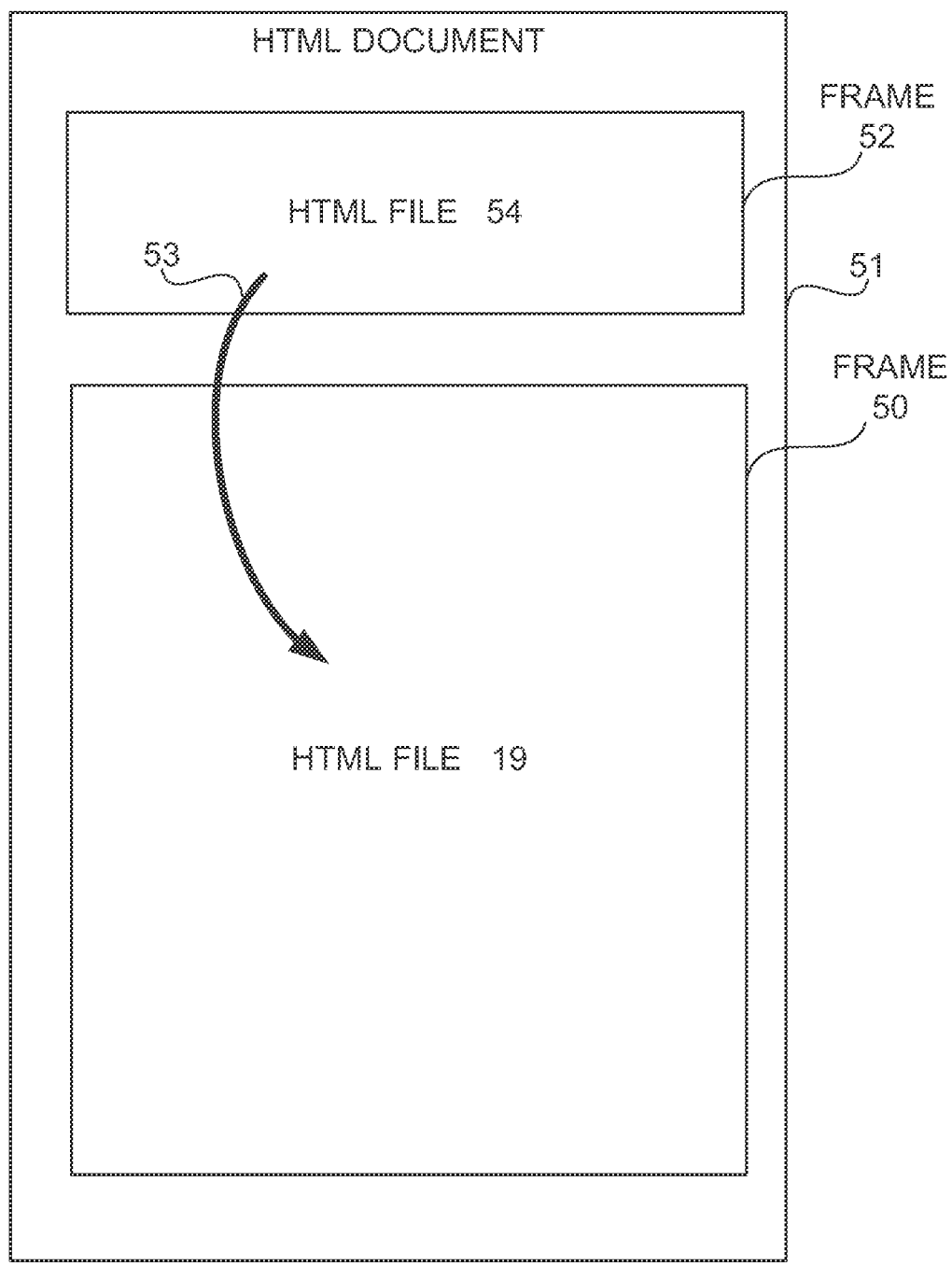
FIG. 15 is a schematic illustration of a Hypertext Markup Language (HTML) document used in an alternative embodiment of the present invention.

An alternative embodiment of the invention is now described. In this alternative embodiment, the HTML file is not modified, rather it is presented to a user within a frame of a further HTML document. Another frame within that HTML document is then configured to monitor interpretation of the HTML file and make appropriate modifications. FIG. 15 provides an overview of operation of this alternative embodiment.

Referring to FIG. 15, it can be seen that the HTML file 19 is provided within a frame 50 of a HTML document 51. The HTML document 51 comprises a further frame 52 which is configured to monitor and affect interpretation of the HTML file 19 within the frame 50. This monitoring and affecting interpretation of the HTML file 19 is schematically denoted by an arrow 53 in FIG. 15.

Figure 16:
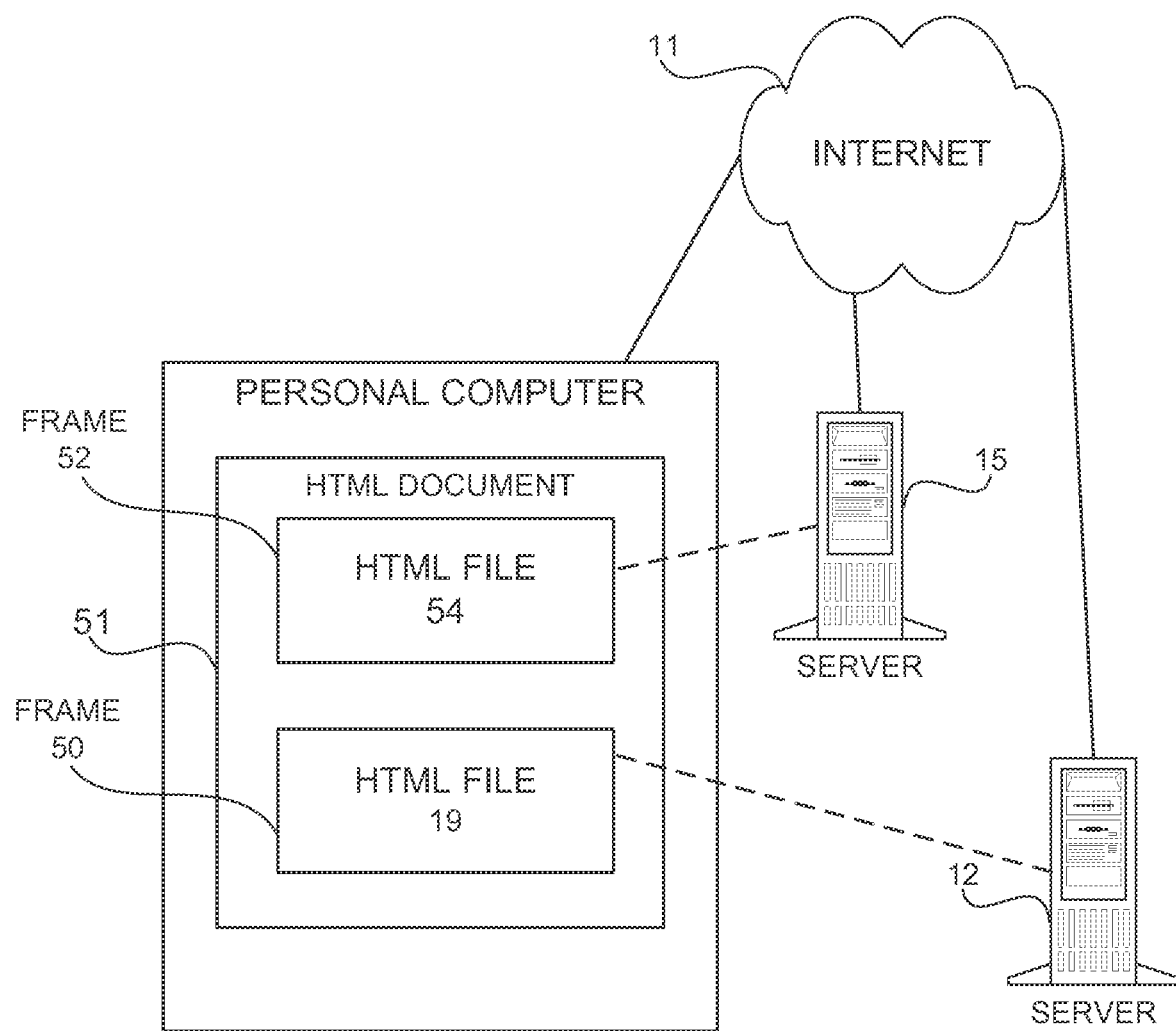
FIG. 16 is a schematic illustration of a network of computer configured to operate using the HTML document of FIG. 15.

Typically, the HTML document 51 is provided to and stored on the personal computer 7 (FIG. 3). The HTML document 51 refers to two HTML files: the HTML file 19 which is referenced by the frame 50, and a HTML file 54 which is referenced by the frame 52. It will be appreciated that the HTML files 19, 54 may be provided by different servers, as shown in FIG. 16. Indeed, it can be seen that while the HTML file 19 is provided to the personal computer 7 from the server 12 configured to provide the source applications 3 the HTML file 54 is provided to the personal computer 7 from the webserver 15 associated with the composer 6. These transfers are illustrated schematically by means of broken lines in FIG. 16, although it will be appreciated that data is in fact transferred between the servers 12, 15 and the personal computer 7 via the Internet 11.

It is however important to note that different servers provide the HTML files for the different frames of the HTML document 51. In such a circumstance, standard HTML security measures prevent the HTML file 54 from monitoring and affecting operation of the second HTML file 19. Such restrictions can be overcome in one of two ways. First the HTML files 19, 54 can both be provided by a common server. In such a circumstance the security measures do not prevent cross-frame modification, and the HTML file 54 can monitor and affect operation of the HTML file 19. Although such a solution is effective, it can be somewhat restrictive, given the need to ensure that a common server provides both HTML files.

A second approach therefore suppresses the security measures by providing the HTML document 51 as a HTML Application (HTA) file. In such a case, the security measures referred to above are inoperative. The HTA file can be downloaded to the personal computer 7 via the Internet 11, and viewed by a user of the personal computer 7 using conventional web-browser software such as Microsoft® Internet Explorer. It is likely that such web-browser software will present a security warning to the user prior to displaying the HTA file, so as to ensure that the user is aware that the referenced document is defined as a HTA file, and therefore suppresses some of the usually imposed security measures. Assuming that the user indicates agreement to the security warning, the HTA file is then interpreted at the personal computer 7 in the same way as any other HTML file. In alternative embodiments of the invention, a HTA file may be stored at the personal computer 7, and reference the HTML files 19, 54 as appropriate. In such a circumstance the user will seemingly have the user application stored at their personal computer. In reality, all that is stored on the personal computer 7 is the HTA file 51 which references appropriate HTML files 19, 54 by means of appropriate URLs. The application can therefore be triggered via the Internet.

Figure 17:
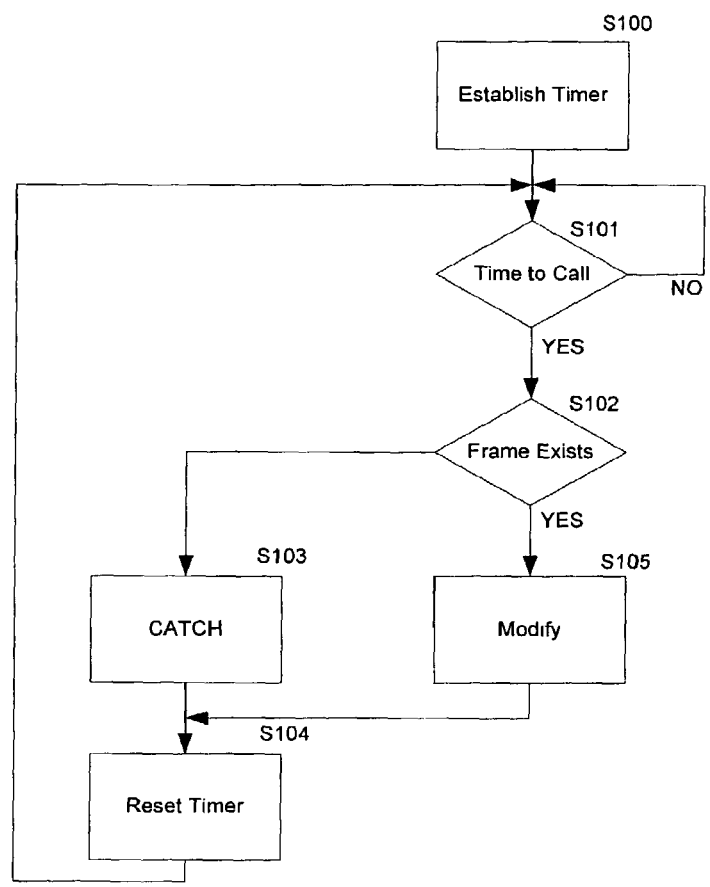
FIG. 17 is a flowchart showing processing carried out by computer program code interpreted within a frame of the HTML document of FIG. 15.

FIG. 17 is a flowchart illustrating operation of the HTML file 54, in monitoring and affecting operation of the HTML file 19. At step S100 a timer is initialised, and starts running. At step S101 a check is made to determine whether the timer initialised and started at step S100 has reached a predetermined value, and if not processing returns to step S101, and this continues until the timer has reached the predetermined value, and processing passes to step S102. At step S102 a check is made to determine whether a predetermined subframe exists within frame 50. The predetermined sub-frame is selected such that when the frame is detected, it can be known that the HTML file within the frame 50 is ready for modification. If the predetermined sub-frame does not exist, an exception is thrown at step S102 which is caught at step S103. The timer is reset at step S104 and processing then returns to step S100. If the predetermined sub-frame is successfully detected, processing passes to step S105 where appropriate modification operations are carried out by calling an insertCode method, as is described in further detail below. Having carried out appropriate modification operations at step S105, processing passes to step S104 where the timer is reset, and then returns to step S101.

Figure 18:
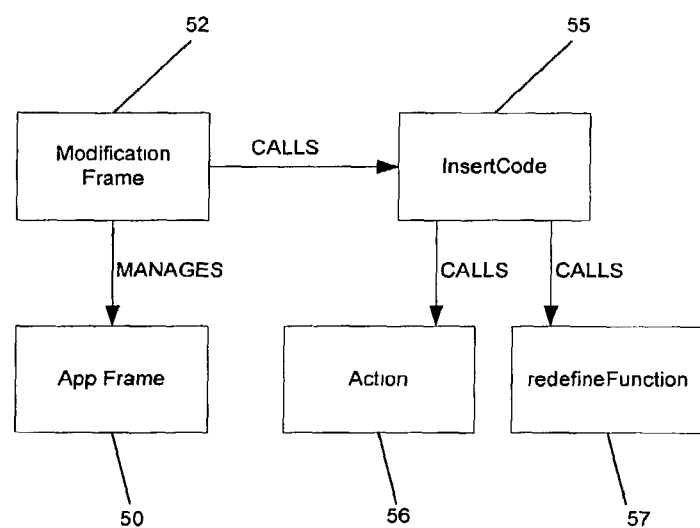
FIG. 18 is a block diagram showing computer program code configured to use the HTML document of FIG. 15.

Reference is now made to FIG. 18, which shows various software components which are used to implement this embodiment of the invention. It can be seen that FIG. 18 shows the frame 50 which references HTML code 19 defining the user interface to be modified, and the frame 52 which references HTML code 54 defining modification operations. The code referenced by the frame 52 calls the insertCode method 55 which controls modification operations. The insertCode method 55 calls an action method 56 and a redefineFunction method 57. Operation of the insertCode method 55, action method 56 and redefineFunction method 57 are described in further detail below.

Figure 19:
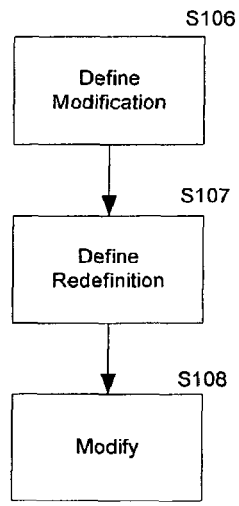
FIG. 19 is a flow chart of a process used to modify a HTML file during interpretation.
Figure 20:
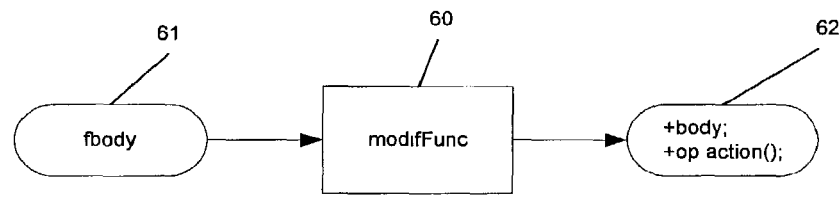
FIGS. 20 and 21 are schematic illustrations of processing carried out by the process of FIG. 19.

Referring to FIG. 19, operation of the insertCode method 55 is described. At step S106 a modification function configured to insert code into the HTML file 19 is defined. This function is shown in further detail in FIG. 20. It can be seen that a modification function modifFunc 60 takes as input data representing a function body 61, and produces as output 62 data comprising the input function body, and a call to an Action method. Thus, the modification function operates to add new code defined by the Action method to the provided function body 61 (representing existing code).

Figure 21:
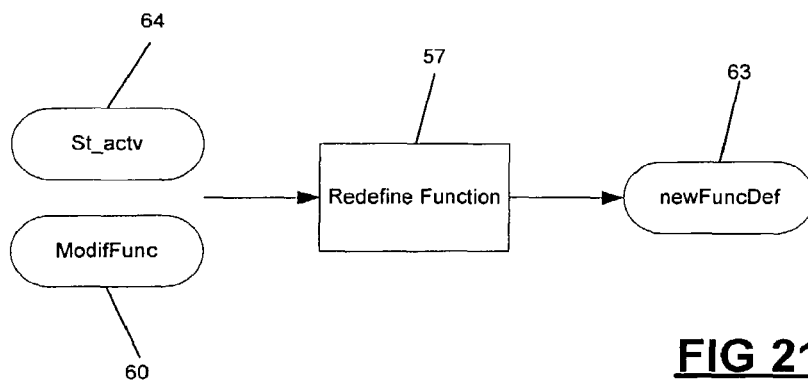

Referring back to FIG. 19, at step S107, a further function newFuncDef 63 is defined. The definition of newFuncDef 63 is shown in FIG. 21. It can be seen that the definition uses the redefineFunction method 57. The redefine function method 57 is not described in further detail here, because it operates in the same way as the similarly named function described above with reference to FIG. 9. The redefineFunction method 57 is called with two parameters. The st_actv method 64 associated with the frame to be modified is specified to be the function to be redefined, while modifFunc 60 (described above) is specified to be the function configured to carry out the modification.

Referring back to FIG. 19, after execution of steps S106 and S107 it can be seen that a method configured to modify the st_actv function 60 using the action method is provided (through the use of newFuncDef alongside modifFunc). This method is then used at step S108 to carry out required modification of the HTML file 19.

Figure 22:
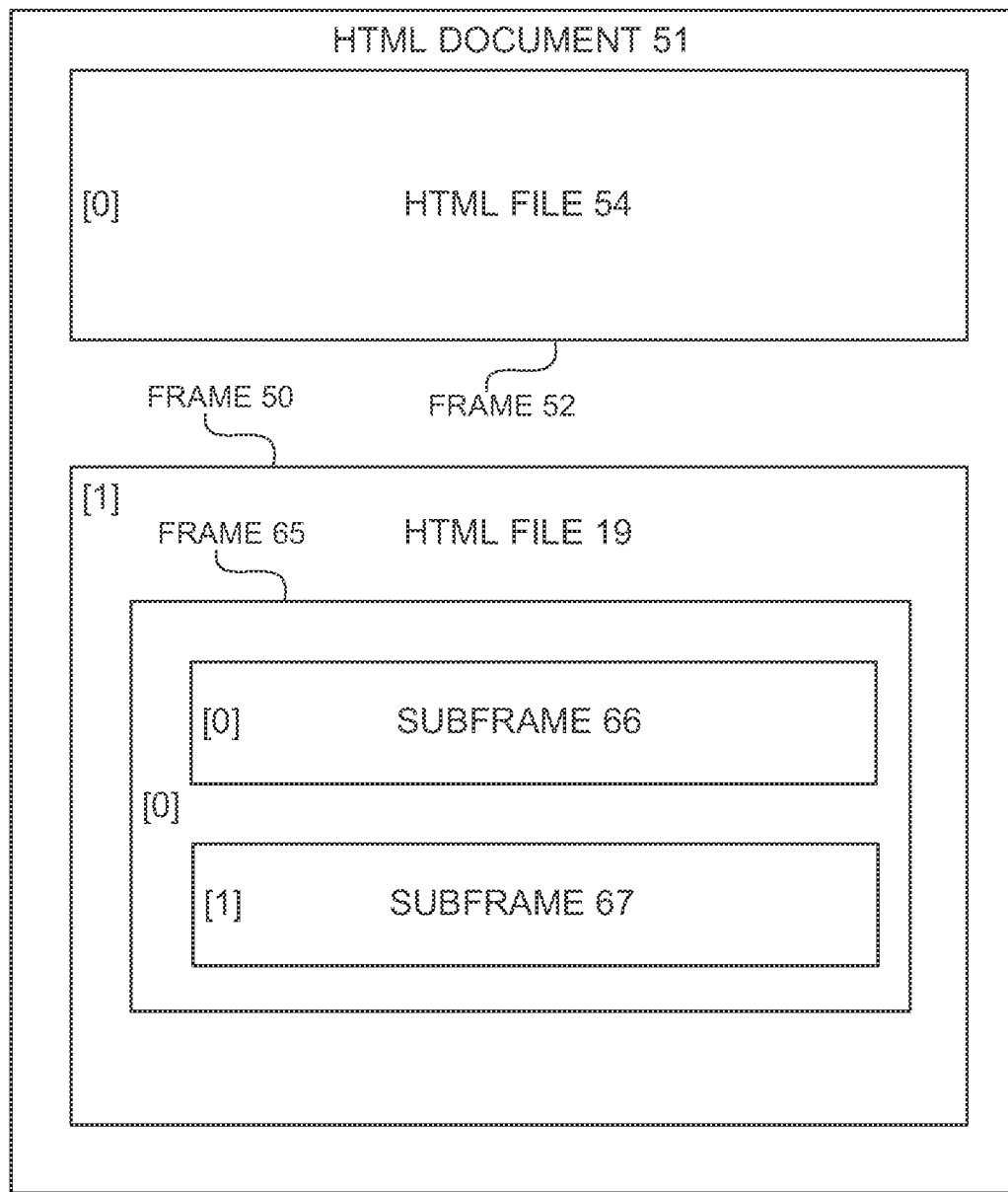
FIG. 22 is a schematic illustration showing the HTML document of FIG. 15 in further detail.

Referring now to FIG. 22, the HTML document 51 is shown in further detail. As described above, the HTML document 51 comprises two frames 50, 52. These frames can be referenced using standard conventions, as is shown in FIG. 22. Specifically, for the document 51, each of its frames, are at runtime frames stored within an array named frames. That is the HTML document 51 is referenced as top, with details of the frame 52 being stored in a first element of its frames array referenced as top.frames[0], and details of the frame 50 being stored in a second element of referenced as top.frames[1].

Similarly, it can be seen that the frame 50 comprises a subframe 65. This subframe will be the only entry in the frames array associated with the frame 50 and will be stored at element 0. Therefore, the absolute reference to the frame 65 is top.frames[1].frames[0]. The subframe 65 in turn has two subframes 66, 67. The subframe 66 is referenced, in absolute terms as top.frames[1].frames[0].frames[0], while the subframe 67 is referenced in absolute terms as top.frames[1].frames [0].frames[1].

In the described embodiment of the present invention, it is the subframe 67 which is to be modified by the HTML file which is provided within the frame 52. Therefore, the st_actv method 64 provided to the redefineFunction method 57 (FIG. 21) is in fact top.frames[1].frames[0].frames[1].st_actv, and it is this function, called when the subframe 67 is displayed, which is modified.

Figure 23:
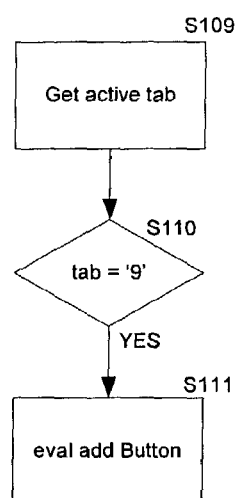
FIG. 23 is a schematic illustration of processing carried out to add a user interface element to the HTML document of FIG. 15.

As described, above, the modification involves use of the action method 56. In this case, operation of the action method 56 is shown in FIG. 23. It should be noted that in the described embodiment the subframe 67 displays an interface comprising a plurality of tabs to a user. The user interface modification is made to a tab of the user interface having an identifier '9'. Accordingly, the Action method (called from within the HTML file 19, given that the call has been added by the insertCode method described above) obtains details of the currently active tab within the frame 67 at step S109. It does this by calling a standard function, namely top.frames[1].frames[0].frames[1].actvtb. The obtained value is then compared with the desired identifier ('9') at step S110, and the desired mofication is then made at step S111. The modification made at step S111 involves executing HTML code configured to add a button to the user interface, and also configured to provide functionality for the added button.

The preceding discussion has set out a generally applicable methodology in which code running within a first frame of a HTML document can monitor behaviour of a second frame of that HTML document. In the described embodiment, the first frame is configured to add code to a particular subframe of the second frame, that code being configured to affect operation of the user interface provided by that subframe. It will be appreciated that in general terms, the first frame may affect behaviour of a plurality of subframes, adding appropriate code to each subframe which is to be affected.

Additionally, in the described embodiment, the first frame is configured to operate with a particular user interface being displayed in the second frame. In general terms, the method described above can be applied such that the first frame determines which of a plurality of predefined user interfaces is displayed in the second frame, and then take action to carry out modification based upon that determination.

It should also be noted that in preferred embodiments of the invention, the first frame is configured so as to have zero size, and therefore as not to be visible to a user when the HTML document is displayed.

Referring back to FIG. 22, it will be appreciated that in order to carry out modification, it is important to obtain details of the hierarchical structure of frames within the HTML document 52 at the time at which the HTML file 54 which is to carry out the modification is generated. A further embodiment of the present invention uses a computer implemented method to provide such details. Such an embodiment is now described.

Figure 24:
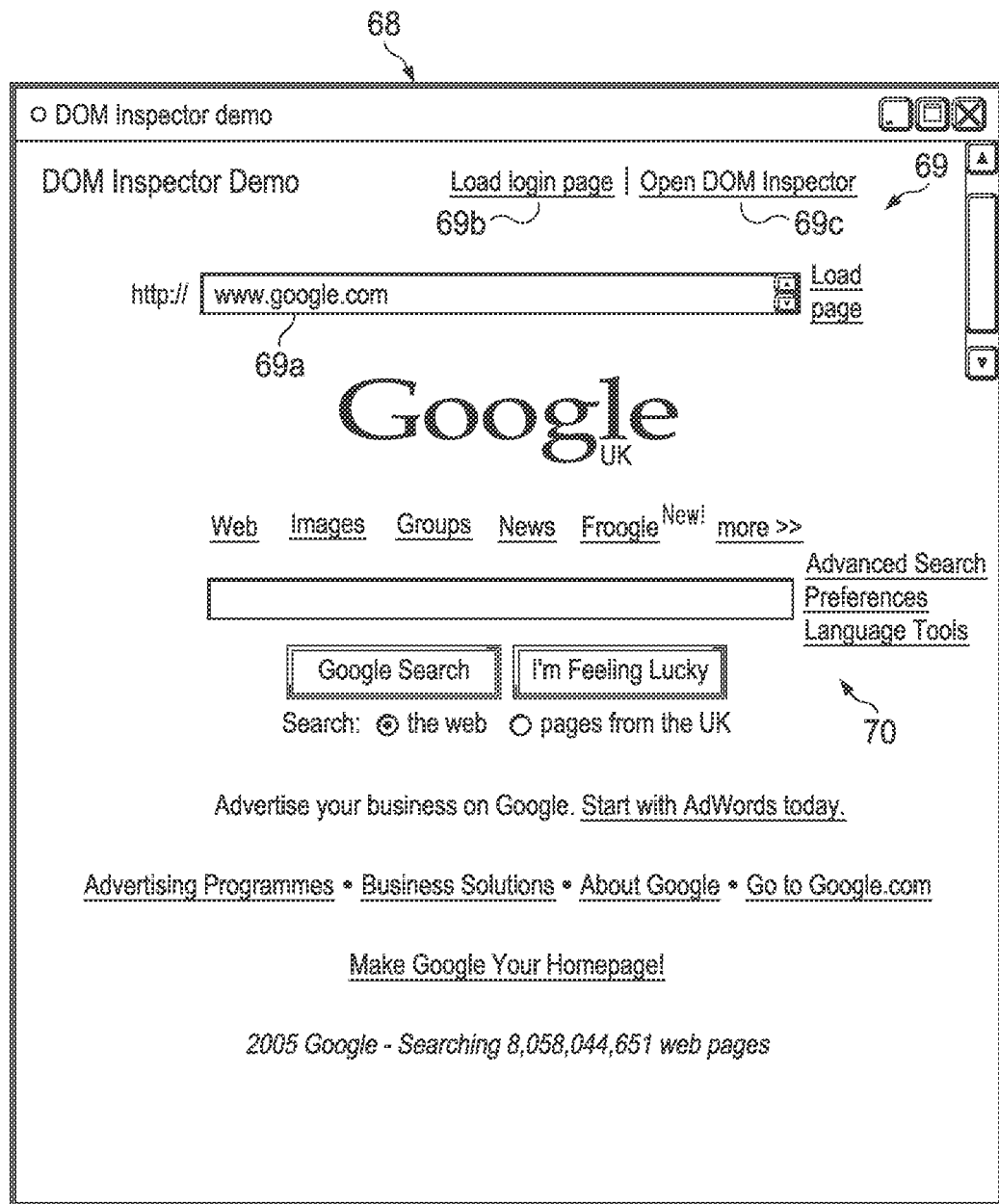
FIGS. 24 and 24A are screenshots of a HTML document used in an alternative embodiment of the present invention.

FIG. 24 shows a HTML document 68 which is used to implement this method. A HTML document 68 comprises two frames 69, 70. Within a first frame 69 there is provided HTML and JavaScript code which is configured to provide an interface used to generate data relating to the structure of a user interface of interest displayed in a second frame 70. It can be seen that the first frame 69 comprises a text box 69a into which a URL of a webpage to be displayed in the second frame 70 is entered. A link 69b simply provides a shortcut to load a page located at a predetermined URL. A link 69c opens a further window 69d which is configured to display information relating to user interface structure. The window 69d is a child of the frame 69, and can therefore reference its parent frame 69 and via the frame 69 the frame 70 containing the user interface of interest. It should be noted that communication between the frames 69, 70 may require the HTML document 69 to be a HTA file, for reasons described above. The window 69d is shown in the screenshot of FIG. 25.

Although in preferred embodiments of the invention, as is described below, data relating to user interface structure is displayed in the window 69d, in alternative embodiments of the invention the data presented in the window 69d could be presented in the window 69. However, it is preferred that an alternative frame is used, so as to provide more screen space to display the relevant information.

Figure 25:
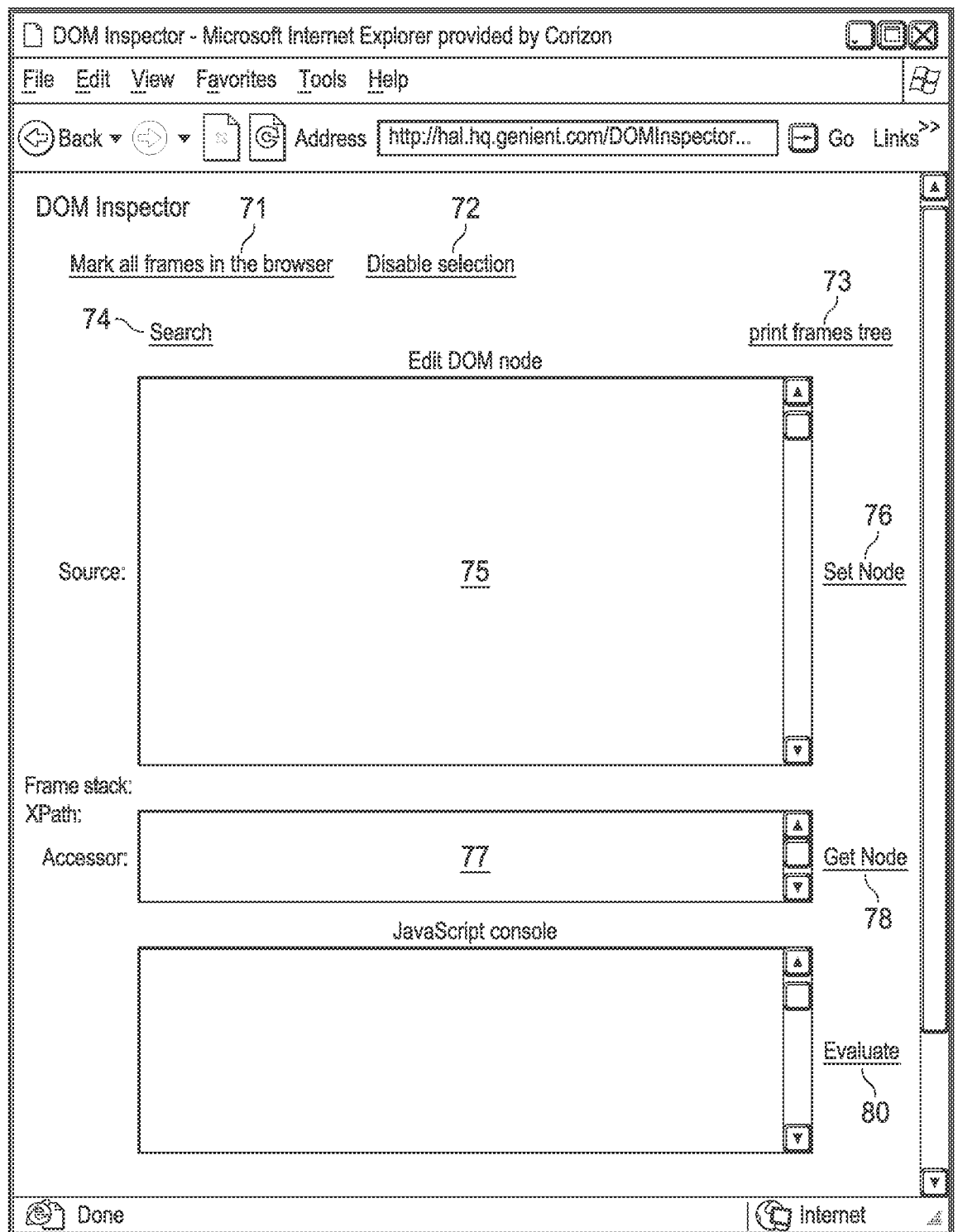
FIGS. 25 and 25A are screenshots of a user interface provided by the embodiment of the invention of FIG. 24.

Referring to FIG. 25, various components of the HTML file displayed in the window 69d, and the way in which they are used to obtain details of user interface structure, are now described. In general terms, the interface shown in FIG. 25 provides means whereby a user can associate handlers with elements of a the user interface whose structure is to be determined, and also provides means whereby a user can obtain and view details of the user interface structure. Details of components of the user interface shown in FIG. 25 are now described, and operation of these components will be described in further detail below. The user interface shown in FIG. 25 comprises a mark frames link 71 which triggers the association of event handlers with elements of the user interface of interest. A disable selection link 72 effectively removes previously added handlers from appropriate user interface elements. A print frames link 73 causes the display of a dialog which indicates hierarchical relationships between frames within the user interface of interest. A search link 74 modifies the user interface shown in FIG. 25 so as to provide search functionality, as is described in further detail below. The illustrated user interface also comprises a text box 75 which indicates source code associated with a selected portion of the user interface which is being investigated. Source code displayed within the textbox 75 can be modified, and then applied to the investigated user interface by use of a set node link 76. The user interface also comprises an accessor text box 77 into which data representing a particular user interface element can be placed, by using a get node link 78. A console text box 79 is also provided. JavaScript code can be entered into this textbox, and evaluated on the interface under manipulation, by use of an evaluate link 80.

Figure 26:
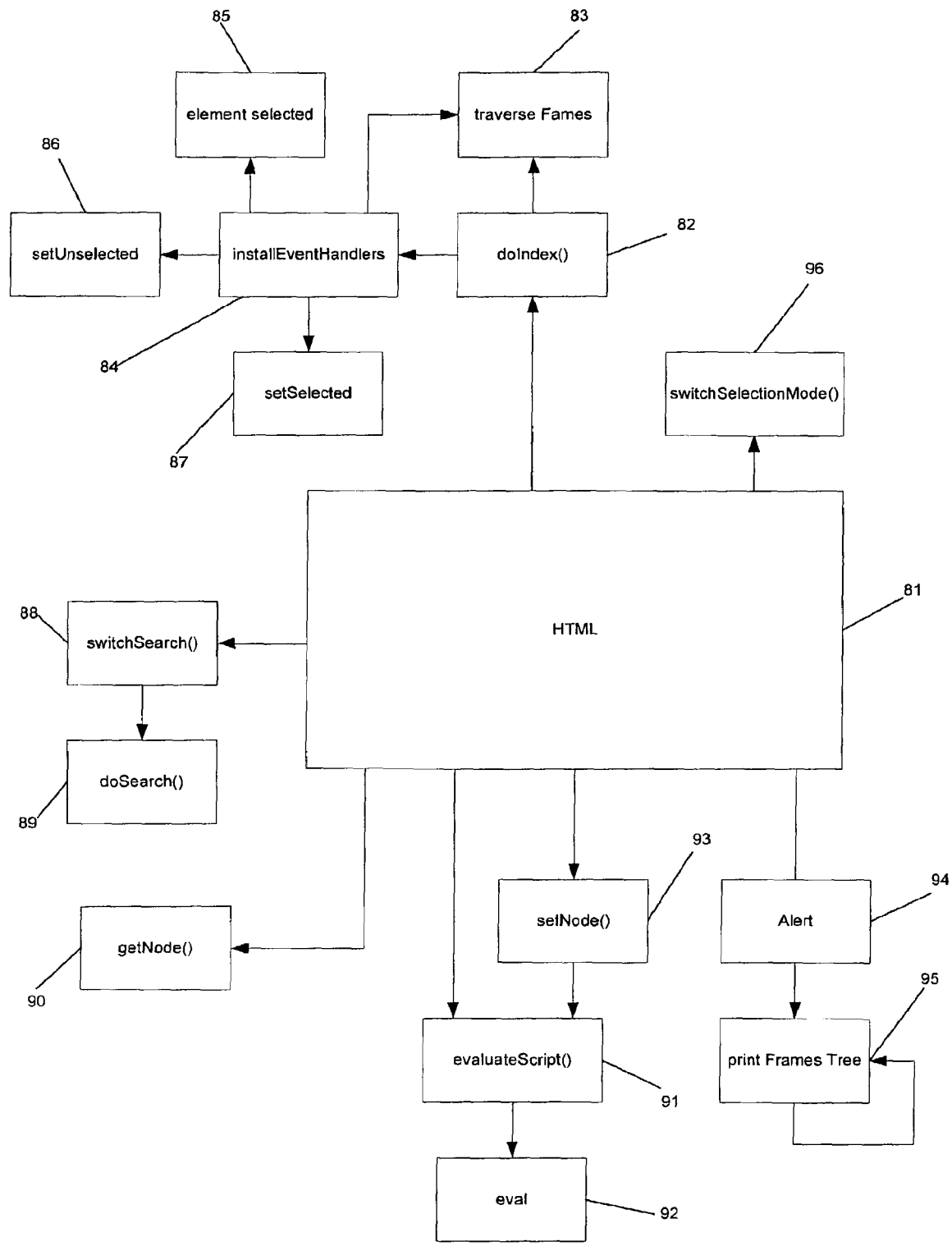
FIG. 26 is a block diagram of computer program code associated with the user interface of FIG. 25.

Referring now to FIG. 26, there is illustrated a block diagram of various software components which are used to implement functionality provided by the user interface shown in FIG. 25. It can be seen that HTML code 81 is central to operation of the interface, and this HTML code provides the user interface described above with reference to FIG. 25. The HTML code 81 calls various JavaScript methods which implement functionality of the user interface shown in FIG. 25. Specifically, it can be seen that the HTML code 81 makes use of a doIndex method 82, which is configured to associate event handlers with various components of the user interface of interest. The doIndex method 82 calls a traverseFrames method 83 which is configured to process each of frame of the user interface of interest in turn. Operation of the traverseFrames method 83 is described in further detail below, although it should be noted that the traverseFrames method 83 is configured to process each frame of the user interface in turn, carrying out an action specified by a method provided as a parameter. In the described embodiment, the installEventHandlers method 84 is provided as a parameter and this method is configured to associate event handlers with frames of the user interface. The installEventHandlers method 84 makes use of three methods: namely an elementSelected method 85, a setUnselected method 86 and a setSelected method 87. Operation of each of these is described in further detail below.

The HTML code 81 also uses a switchSearch method 88 to amend the interface provided to present search functionality. The switchSearch method 88 in turn uses a doSearch method 89 to conduct search operations.

The HTML code 81 uses a getNode method 90 to implement functionality associated with the get node link 78. An evaluateScript method 91 is used to implement the evaluate link 80, and the evaluateScript method in turn calls an eval method 92 which is a standard JavaScript method. A setNode method 93 is used to implement functionality associated with the set node link 76.

The print frames tree link 73 uses a conventional alert method 94 to generate a dialog which is displayed to a user. The alert method 94 uses a printFramesTree method 95 to generate data for inclusion within the displayed dialog. The HTML code 81 also uses a switchSelectionMode method 96 to implement the disable selection link 72.

Having described the interface with reference to FIG. 25, and having described the code used with reference to FIG. 26, operation of the interface is now described with reference to subsequent figures.

Operation of the mark frames link 71 of the user interface of FIG. 25 is now described. This link processes each element of the user interface of interest in turn, and attaches event handlers to each. These event handlers are such that when a user hovers a pointing device over an element, that element's border is highlighted, and that element's background is changed. When the pointing device leaves the element, the border is no longer highlighted, and the background reverts to normal. This provides a convenient mechanism whereby a user can see the elements within the user interface of interest, and the frames within which the elements are located, by simply moving their pointing device over the interface.

Figure 27:
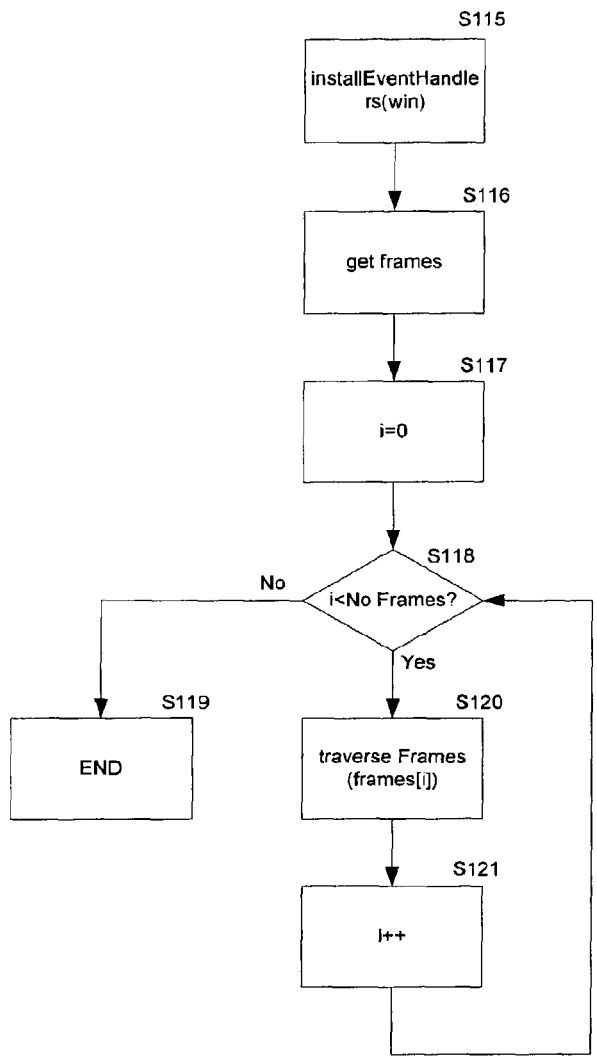
FIG. 27 is a flowchart of a process for associating event handlers with frames of a user interface of interest, in the embodiment of the invention of FIG. 24.

The doIndex method 82 is configured to apply appropriate event handlers to frames within the user interface of interest. This is achieved by calling the traverseFrames method 83, with the installEventHandlers method 84 as a parameter. Operation of the traverseFrames method 83 is illustrated by the flowchart of FIG. 27. At step S115 the installEventHandlers method 84 (which was passed as a parameter) is called with a parameter win. The installEventHandlers method 84 proceeds to associate appropriate event handlers with the top level frame of the user interface of interest represented by the parameter win (i.e. the top level user interface frame). Operation of the installEventHandlers method 84 is described in further detail below.

At step S116, frames within the user interface of interest are obtained, a counter variable which is to count through these frames is then initialised at step S117. At step S118 a check is made to ensure that the counter variable has a value which is less than the number of frames within the user interface of interest. If this check is not satisfied, processing ends at step S119. In such a circumstance it is known that appropriate event handlers have been associated with the top level frame of the user interface of interest, and also with all subframes, given the processing that is now described, starting at step S120.

At step S120 the traverseFrames method 83 is called on the frame indicated by the counter variable. Thus, event handlers are added to that subframe, and given the recursive nature the traverseFrames method 83 event handlers are also added to all subframes of the frame indicated by the counter variable. Having processed the frame indicated by the counter variable (and all its subframes) at step S121, the counter variable is incremented at step S121, and processing then returns to step S118. From the preceding discussion, it can be seen that the traverseFrames method 83 operates so as to call the installEventHandlers method 84 on each frame and subframe in turn.

Figure 28:
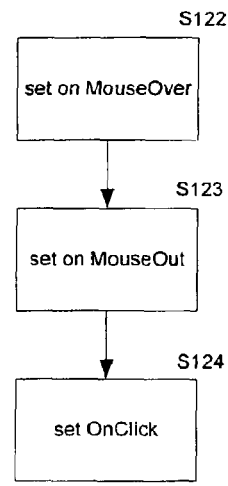
FIG. 28 is a flowchart of a process for associating a plurality of event handlers with a predetermined frame, used in the process of FIG. 27.

Operation of the installEventHandlers method 84 is now described with reference to FIG. 28. It will be recalled that this method is called with a particular frame as a parameter, and from FIG. 28 it can be seen that during operation the method applies a onMouseOver method at step S122, an onMouseOut method at step S123 and an onClick method at step S124. These methods are applied to each processed frame. The onMouseOver method is called when a pointer is placed within a frame, the onMouseOut method is called when the pointer leaves the frame, and the onClick method is called when the pointer is clicked within the frame. Each of these methods is now described.

Figure 29:
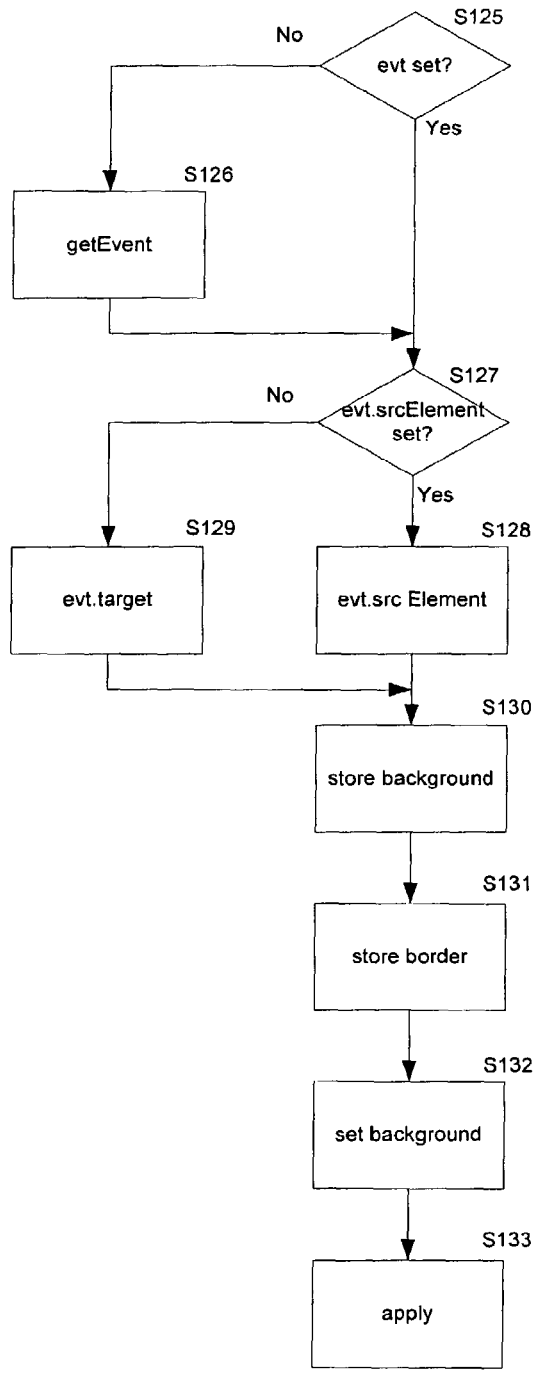
FIG. 29 is a flowchart of an event handler associated with mouse over events, used in the embodiment of the invention of FIGS. 27 and 28.

The onMouseOver method is defined using the setSelected method 87, which is now described with reference to FIG. 29. At step S125 a check is made to ensure that an evt variable containing details of the event which resulted in the handler method being called is defined. If the evt variable is undefined, a getEvent method is called at step S126 to obtain details of the currently active event. At step S127 a check is made to determine whether the event responsible for the handler being called has a srcElement variable which is set. If this is the case, future processing will use this source element (step S128). Otherwise, a target element of the event is obtained at step S129 for future use. Having determined the element on which the method is to operate, processing continues at step S130, where the current background of that element is stored for future use. Similarly, at step S131 the current border is saved for future use. At step S131 a new background is set, and at step S132 a new border is set. The changes made are then applied at step S133.

Figure 24A:
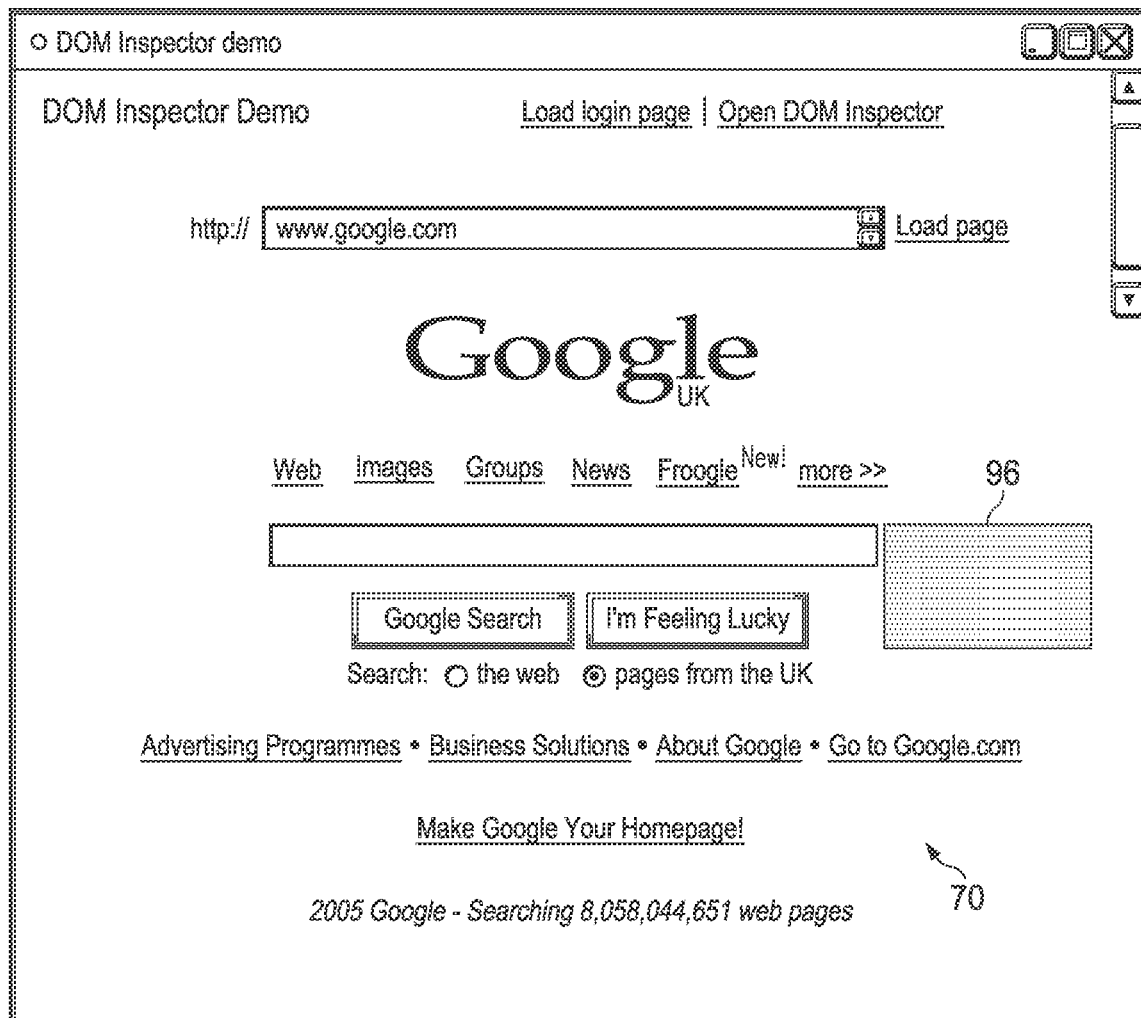

Having described operation of the function which is used to define the onMouseOver method, it should be noted that in use this function will be called when a pointer is placed over a frame having the handler attached. In such a circumstance the border and background are amended as indicated above. For example, the border of the frame may be highlighted in red, with a blue background being applied to the frame. FIG. 24A shows an element 96 with a frame 70 highlighted through the action of the onMouseOver method.

Figure 30:
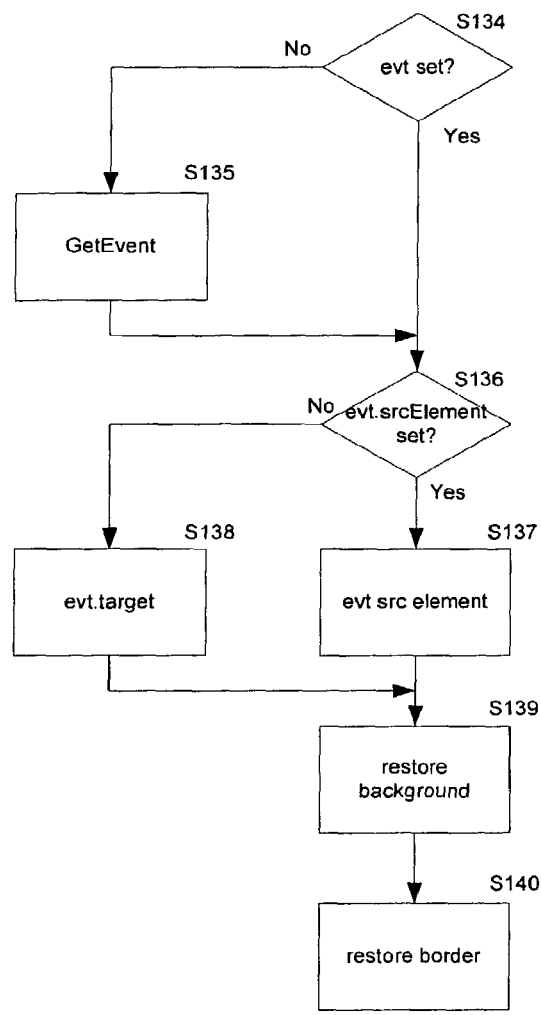
FIG. 30 is a flowchart of an event handler associated with mouse out events, used in the embodiment of the invention of FIGS. 27 and 28.

FIG. 30 shows the setUnselected method 86 which is used to define behaviour of the onMouseOut method. It should be noted that in this case, the handler should remove highlighting applied by the onMouseOver method, and return the frame to its original appearance. At step S134, a check is made to ensure that an evt variable containing details of the event which resulted in the handler method being called is defined. If the evt variable is undefined, a getEvent method is called at step S135 to obtain details of the currently active event. At step S136 a check is made to determine whether the event responsible for the handler being called has a srcElement variable which is set. If this is the case, future processing will use this source element (step S137). Otherwise, a target element of the event is obtained at step S138 for future use. Having determined the element on which the method is to operate, processing continues at step S139, where the frame's background before action of the onMouseOver method is restored. Similarly, at step S140, the frame's border as it was before action of the onMouseOver method is restored.

Figure 31:
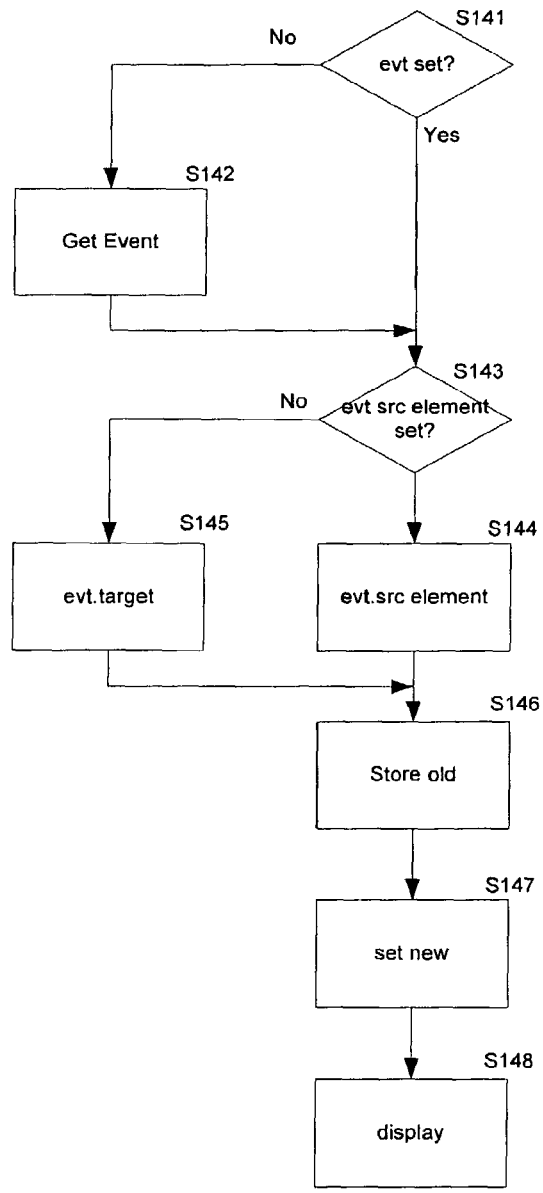
FIG. 31 is a flowchart of an event handler associated with mouse click events, used in the embodiment of the invention of FIGS. 27 and 28.

The final handler applied by the installEventHandlers method 84 is the onClick method which is defined using the elementSelected method 87, illustrated by the flowchart of FIG. 31. At step S141, a check is made to ensure that an evt variable containing details of the event which resulted in the handler method being called is defined. If the evt variable is undefined, a getEvent method is called at step S142 to obtain details of the currently active event. At step S143 a check is made to determine whether the event responsible for the handler being called has a srcElement variable which is set. If this is the case, future processing will use this source element (step S144). Otherwise, a target element of the event is obtained at step S145 for future use.

Figure 25A:
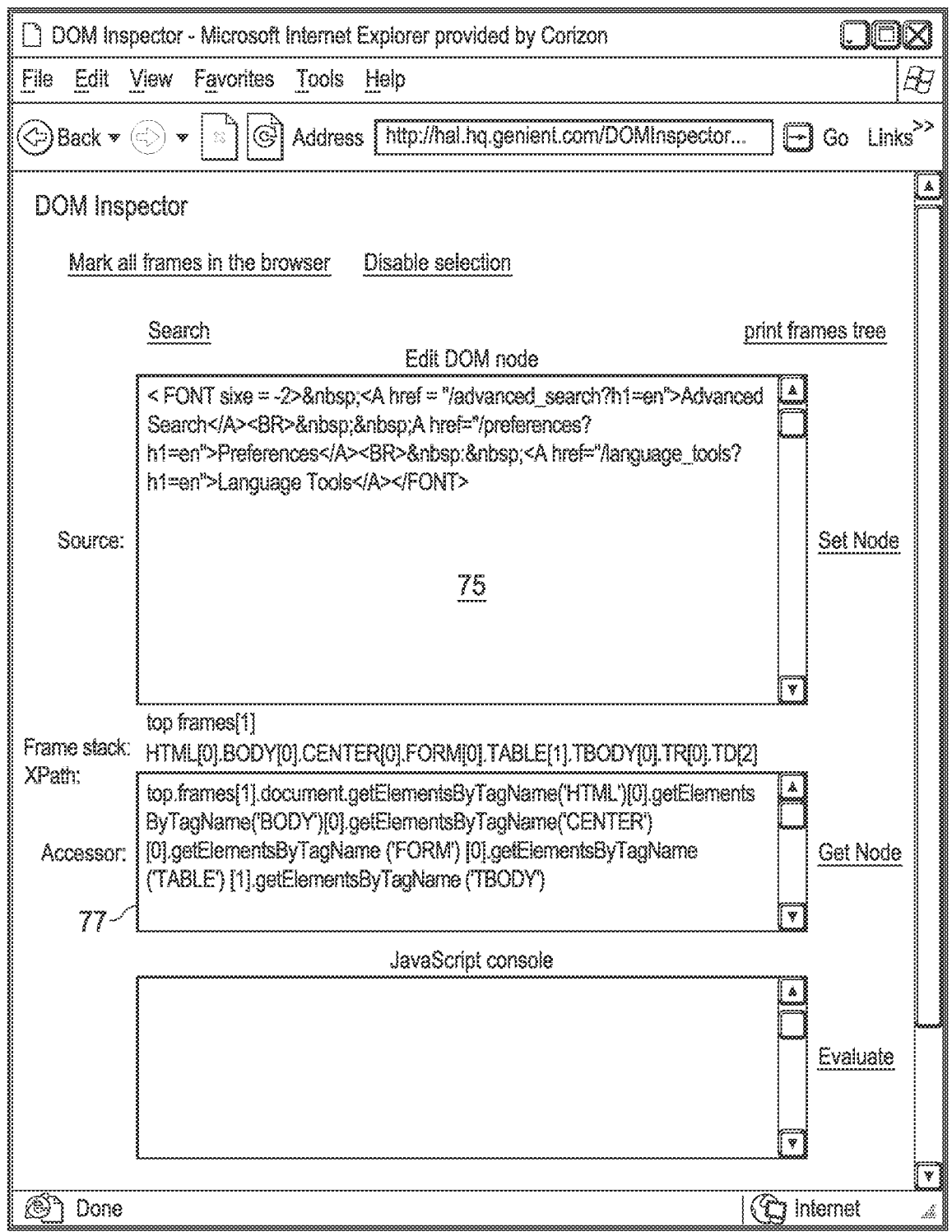

Having determined the element on which the method is to operate, processing continues at step S146, where old properties of the appropriate frame (e.g. background and border properties as described above) are stored. New properties are then applied at step S147. In a preferred embodiment, these new properties are such that the frame has a red border. At step S148, details of the selected frame are provided to the user interface illustrated in FIG. 25. Specifically, the element associated with the handler is processed to identify its path, which data is written to the textbox 77 of FIG. 25. Additionally, the HTML source defining the element is written to the text box 75. This is shown in FIG. 25A.

To summarise, it will be appreciated that by adding handlers as described above, hovering a pointer over elements of the interface of interest will provide useful visual information within that interface of interest. Additionally, clicking a pointer within a frame will result in pertinent information being provided to the user interface illustrated in FIG. 25.

Figure 32:
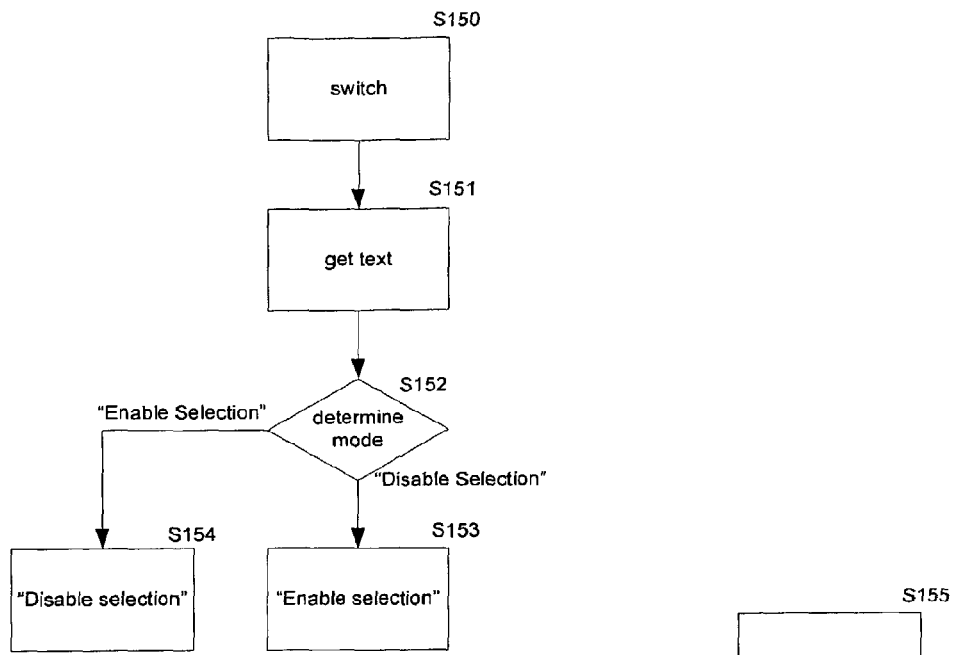
FIG. 32 is a flowchart of a method triggered by the interface of FIG. 25, to enable and disable event handlers.

Referring again to FIG. 25, operation of the disable selection link 72 is now described. Selecting this link has the effect of disabling the handlers associated with elements of the user interface of interest. When this link is selected the value of a Boolean enableSelection parameter is inverted, as shown at step S150 of FIG. 32. Having done this, text of the link 72 is obtained at step S151, and action is then determined based upon this obtained text at step S152. Specifically, if the text of the link 72 is determined to read "Disable Selection" (as in FIG. 25) it can be determined that the handlers will have been disabled. Accordingly the link should now read "Enable Selection" so as to provide a link to allow the user to activate the handlers. This is done at step S153. Conversely, if the text is determined to read "Enable Selection" it can be determined that handlers have just been enabled, and the text should therefore be amended to read "Disable Selection", as is done at step S154.

It should be noted that the event handler functions described above, are configured so as to determine the value of the enableSelection parameter. Only if this parameter is set to TRUE do the handlers function as described above. Otherwise, the events described above do not trigger the handlers to carry out the actions which have been described above.

Operation of the print frames tree link 73 is now described with reference to FIG. 33, which illustrates operation of the printFramesTree method 95. On selection of the print frames tree link 73, the standard JavaScript alert method 94 is called. As is usual, this method is provided with a string which is to provide text for the alert. In this case, this text is defined by a call to the printFramesTree method 95, which generates a string to be displayed by the alert.

The printFramesTree method 95 takes three parameters. A first parameter indicates a frame on which it is to operate, a second parameter indicates indentation which should be inserted between frames within the alert, and a third parameter represents a string buffer, which is to be used to build up the output string. When the printFramesTree method is initially called, the frame will be the top level frame, the indentation will be specified to be a predetermined number of white space characters (determined by the required formatting) and the third parameter will be an empty string.

Figure 33:
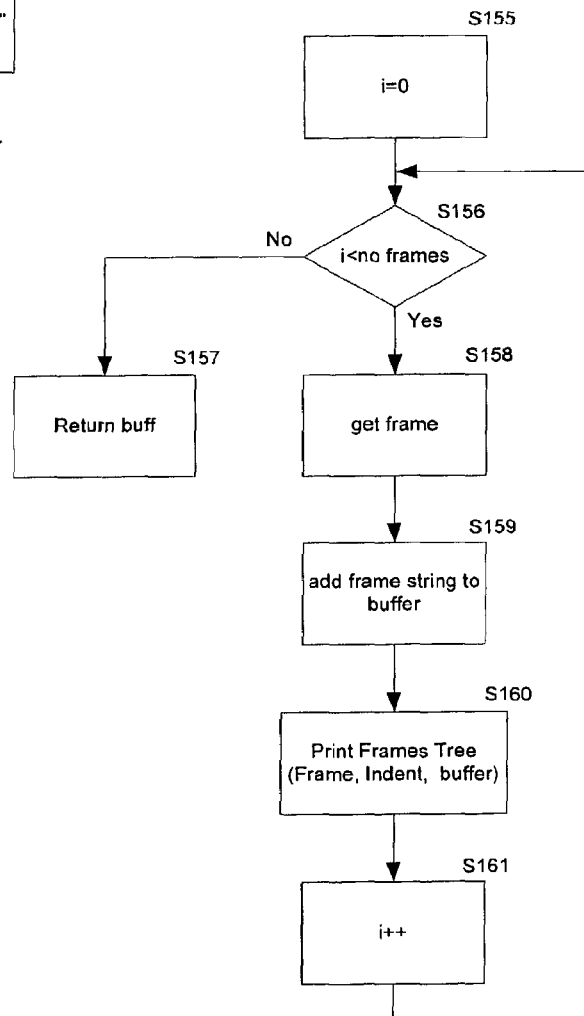
FIG. 33 is a flowchart of a method triggered by the interface of FIG. 25 for generating a tree of frames within an interface of interest.

Referring to FIG. 33, at step S155 a counter variable, which is to count through all frames, is initialised. At step S156 a check is made to ensure that the counter variable value is less than the total number of frames. If this check is not satisfied, it can be determined that all frames within the provided frame have been processed, and the buffer will therefore contain the desired text string, which is returned at step S157. Otherwise, the frame indicated by the counter variable is obtained at step S158, and the hierarchical reference of this frame is added to the buffer (step S159). At step S160, the printFramesTree method 95 is called with the currently processed frame as its first parameter, and a suitable indentation parameter. Thus, the printFramesTree method is recursive, and ensures that all a frame's subframes are correctly processed. It should be noted that at step S160 the printFramesTree method will be called with the currently defined buffer, such that any generated data is added to that buffer. The call to the printFramesTree method at step S160 will return when all subframes (including any subframes thereof, by recursion) have been processed. Appropriate data for these subframes will be returned in the buffer. At step S161 the counter variable is incremented, and processing returns to step S156 where the next frame is processed. In this way, a complete tree of frames is generated for display by the alert method 94.

Figure 34:
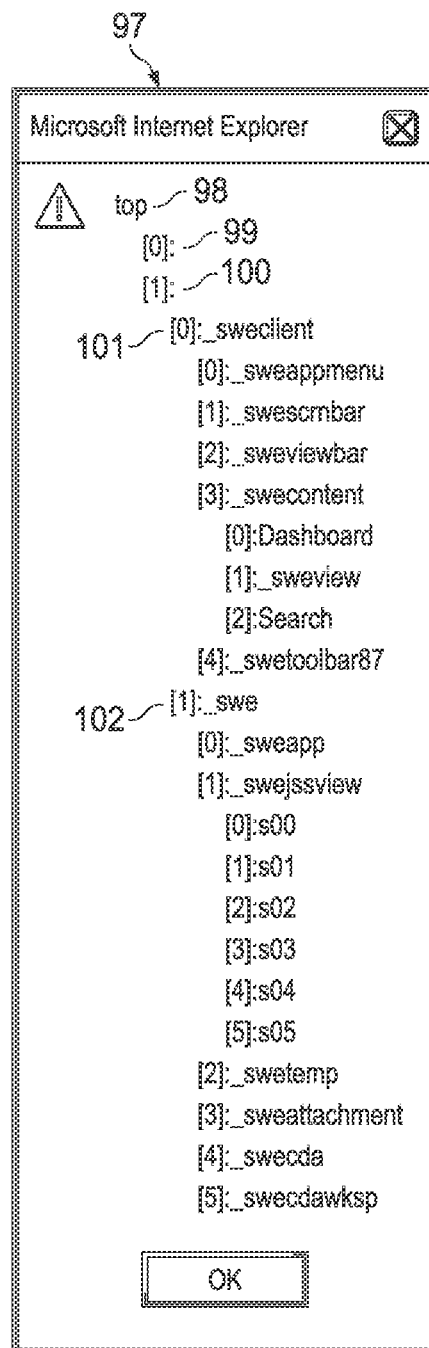
FIG. 34 is an alert illustrating a tree of frames generated using the method of FIG. 33.

FIG. 34 illustrates an alert 97, generated using the processing described above. It can be seen that by careful use of the indentation parameter during successive calls to the printFramesTree method 95, an easy to read tree is produced. Specifically, it can be seen that each hierarchical level is neatly indented. That is, a single top level frame 98 has two subframes 99, 100. The subframe 100 in turn has two subframes 101, 102, each of which have further subframes shown in FIG. 34. Thus, it can be seen that the methods described above allow easy to read frames trees to be generated.

Figure 35:
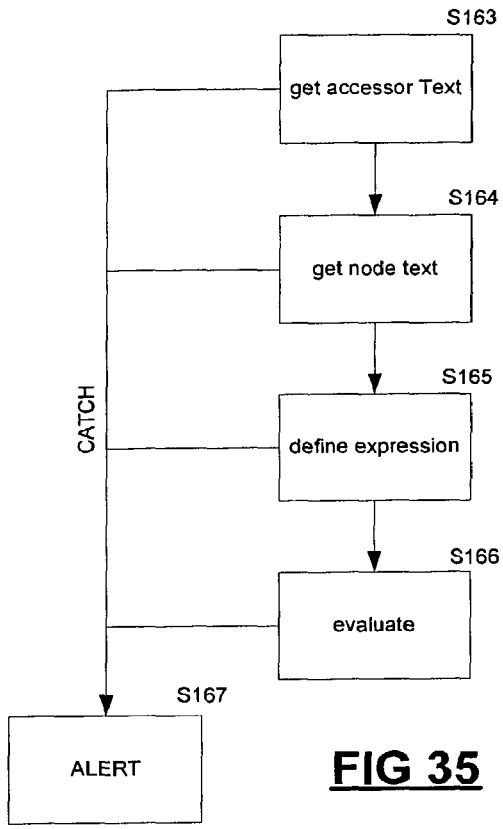
FIGS. 35 and 36 are flowcharts of methods triggered by the interface of FIG. 25 to process text within the interface.

Operation of the set node link 76 is now described with reference to FIG. 35. On selection of this set node link 76, text in the textbox 77 is read (step S163). Text from the textbox 75 is then read at step S164. At step S165, the text from the textboxes 75, 77 is combined so as to determine the HTML code (from textbox 75) which should be applied to the node (defined in textbox 77). The determined expression is then evaluated at step S166 by using the evaluateScript method 91. It should be noted that the evaluateScript method 91 simply calls the JavaScript eval method 92 to cause the determined expression to be evaluated within the user interface of interest.

It should be noted that each of steps S163 is executed within a "try" statement, and if any exception is thrown, this is caught, and an appropriate alert is displayed at step S167.

Figure 36:
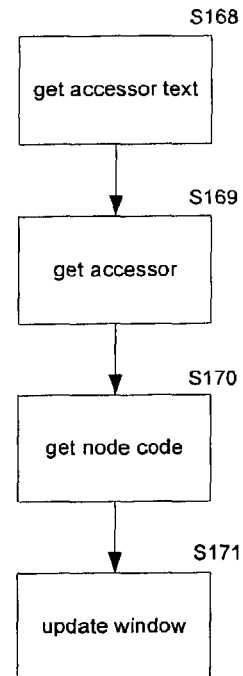

Operation of the get node link 78 is now described with reference to FIG. 36. At step S168, text present in the text box 77 is read, and this text is used to locate the appropriate user interface element at step S169. At step S170 HTML code defining the user interface element is obtained, and having obtained the appropriate code, this is displayed in the textbox 75 at step S171.

Therefore, the get node link 77 allows a particular node to be specified within the textbox 77, and HTML code for that node will then appear in the textbox 75. Using the set node link 76, any changes made to the HTML code in the textbox 75 will be reflected in the user interface of interest. Thus, the provided methods provide useful tools for determining how modifications should be carried out, and testing the results of such modifications. Such methods can usefully be employed to determine how a user interface is to be modified at a client computer, for example using methods as described earlier, to affect operation of the user interface.

It should also be noted that the console text box 79 can be used during development work to enter JavaScript code, which can subsequently be evaluated within the user interface of interest by selecting the evaluate link 80.

Figure 37:
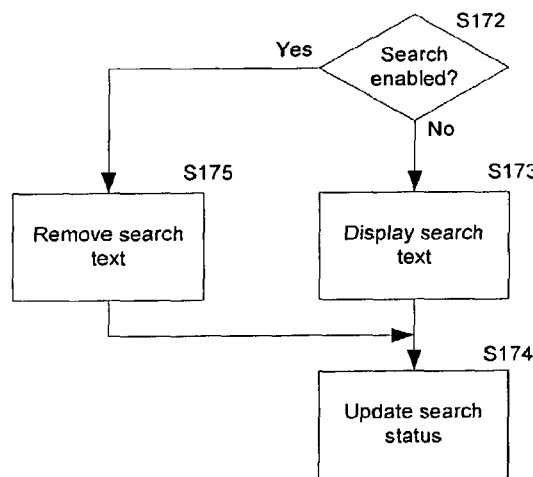
FIG. 37 is a flowchart of a method triggered by the interface of FIG. 25 to provide search functionality within that interface.

Operation of the search link 74 is now described. Selection of the search link 74 results in a call being made to the switchSearch method 88, operation of which is now described with reference to FIG. 37. At step S172 a check is carried out to determine whether search functionality is currently enabled. If this is not the case (as in the illustration of FIG. 25), search functionally is displayed at step S173, and search status is updated at step S174.

Figure 38:
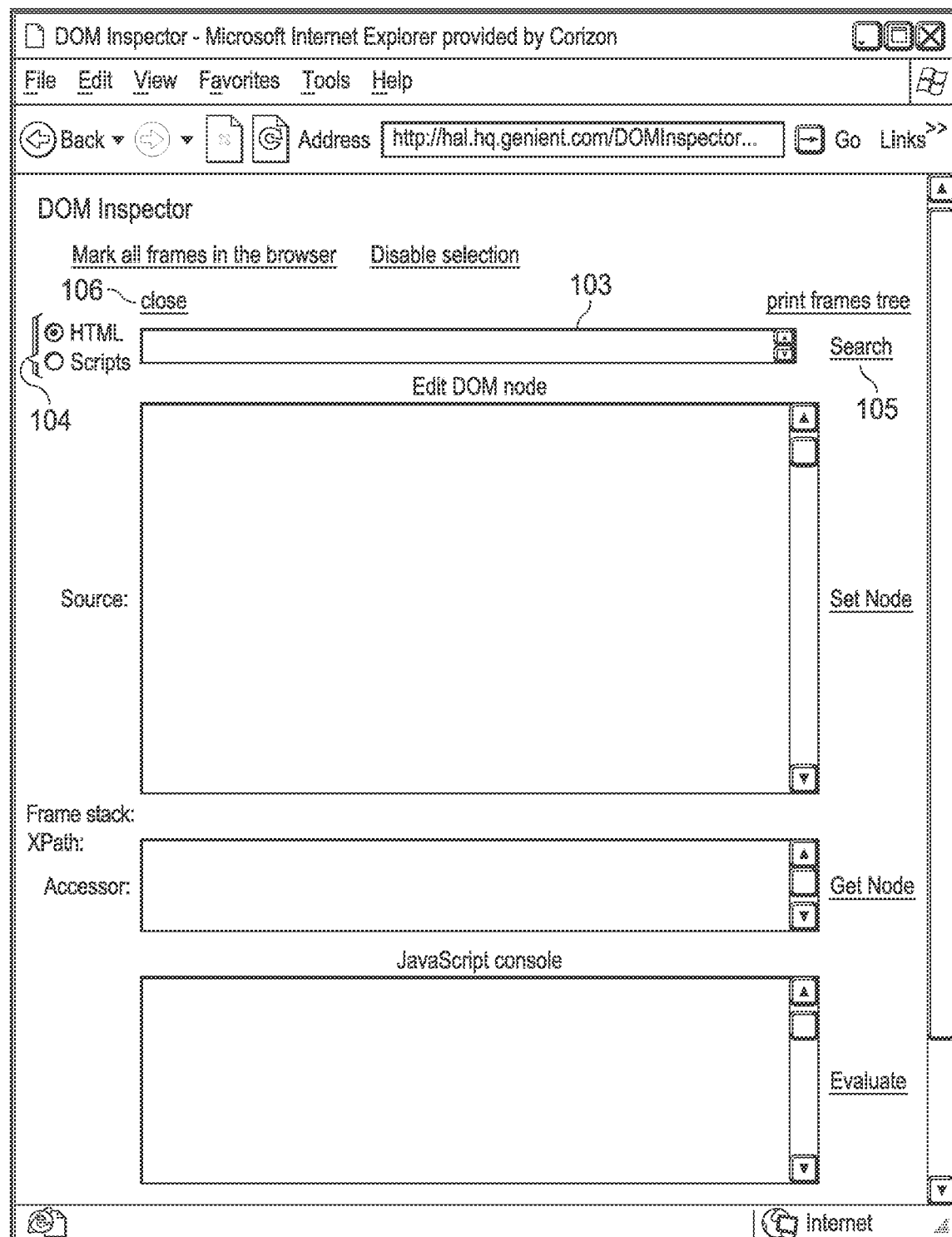
FIG. 38 is a screenshot showing the interface of FIG. 25 after the addition of search functionality.

Display of search functionality at step S173 results in the interface shown in FIG. 25 being modified to be in accordance with that shown in FIG. 38. It can be seen that the interface now includes a further text box 103 into which search queries can be input. The interface further comprises a pair of radio buttons 104 which allow searches to be specified as HTML searches or script searches, the significance of which is described below. A search link 105 is provided to trigger a search when text has been entered in the text box 103. A close link 106 is used to remove the search functionality from the interface, thereby causing the interface to return to the form shown in FIG. 25. Selection of the close link 106 causes the switchSearch method 88 to be called. Now, however, the check of step S172 determines that search functionality is currently enabled, and accordingly processing passes to step S175 where search elements of the interface are removed, before processing continues at step S174 as described above.

Figure 39:
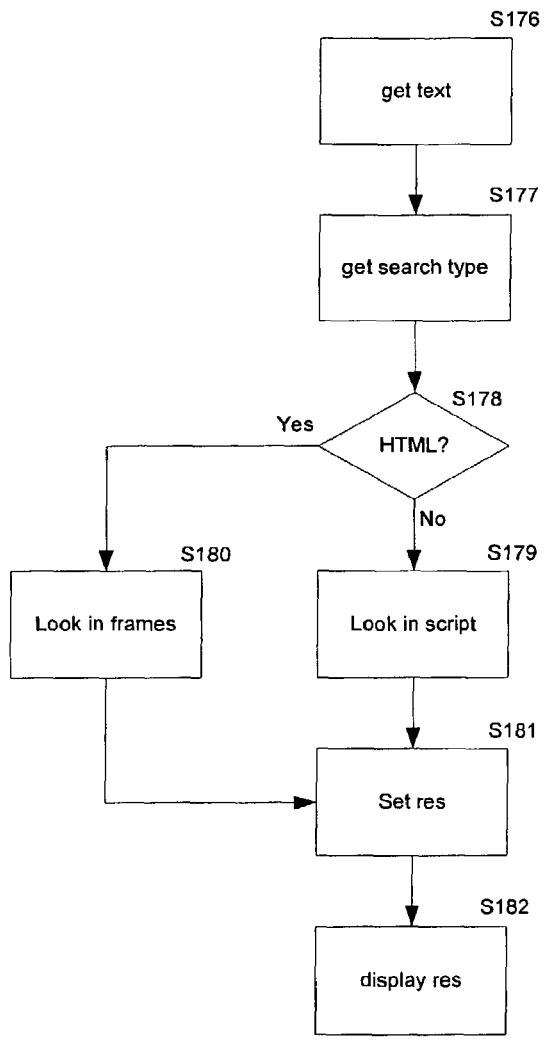
FIG. 39 is a flowchart of a method triggered by the interface of FIG. 38 to carry out search operations.

Use of the search functionality provided by the interface of FIG. 38 is now described with reference to FIG. 39. At step S176 text from the textbox 103 is obtained, and at step S177 details of search type are obtained from the radio buttons 104. At step S178 a check is made to determine whether the search type is HTML or script. If the search type is script, search operations are carried out at step S179 to locate text entered in the textbox 103 within scripts of the user interface of interest. Otherwise, if the search type is HTML, search operations with HTML defining the user interface of interest are carried out at step S180. The search operations operate in a conventional manner, identifying every expression within the scripts or HTML respectively, which includes the text specified in the textbox 103. The search operations return a text string, which is set at step S181, and then displayed using the interface at step S182.

Figure 40:
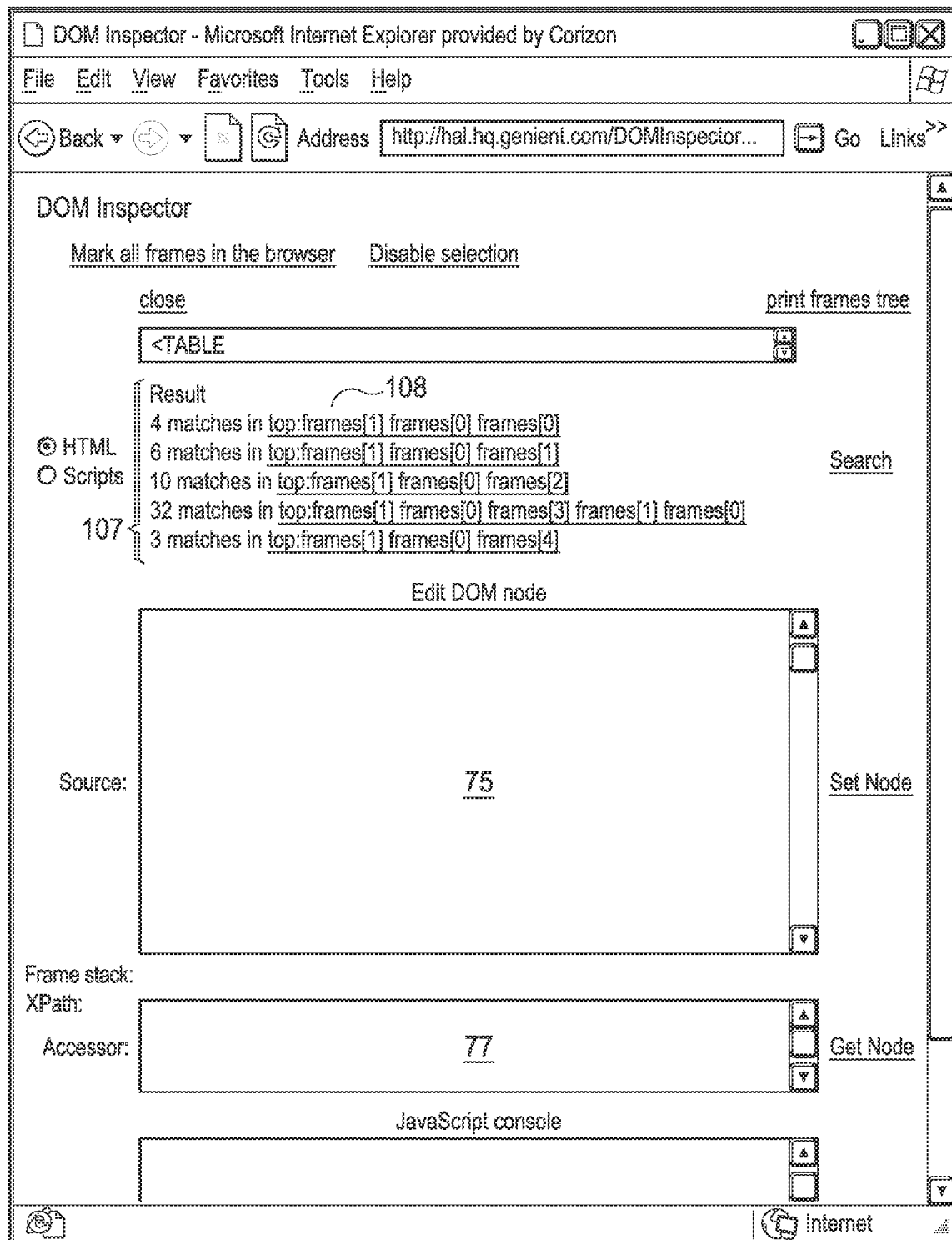
FIG. 40 is a screenshot of the interface of FIG. 38, showing generated search results.

Referring to FIG. 40, the results of a HTML search for the expression "<TABLE" are shown in an area 107 of the interface. It can be seen that the results are shown in terms of the number of results occurring within each frame of the interface of interest. Each frame in which results were found is shown as a link. Selection of one of these links results in population of the textboxes 75, 77.

Figure 41:
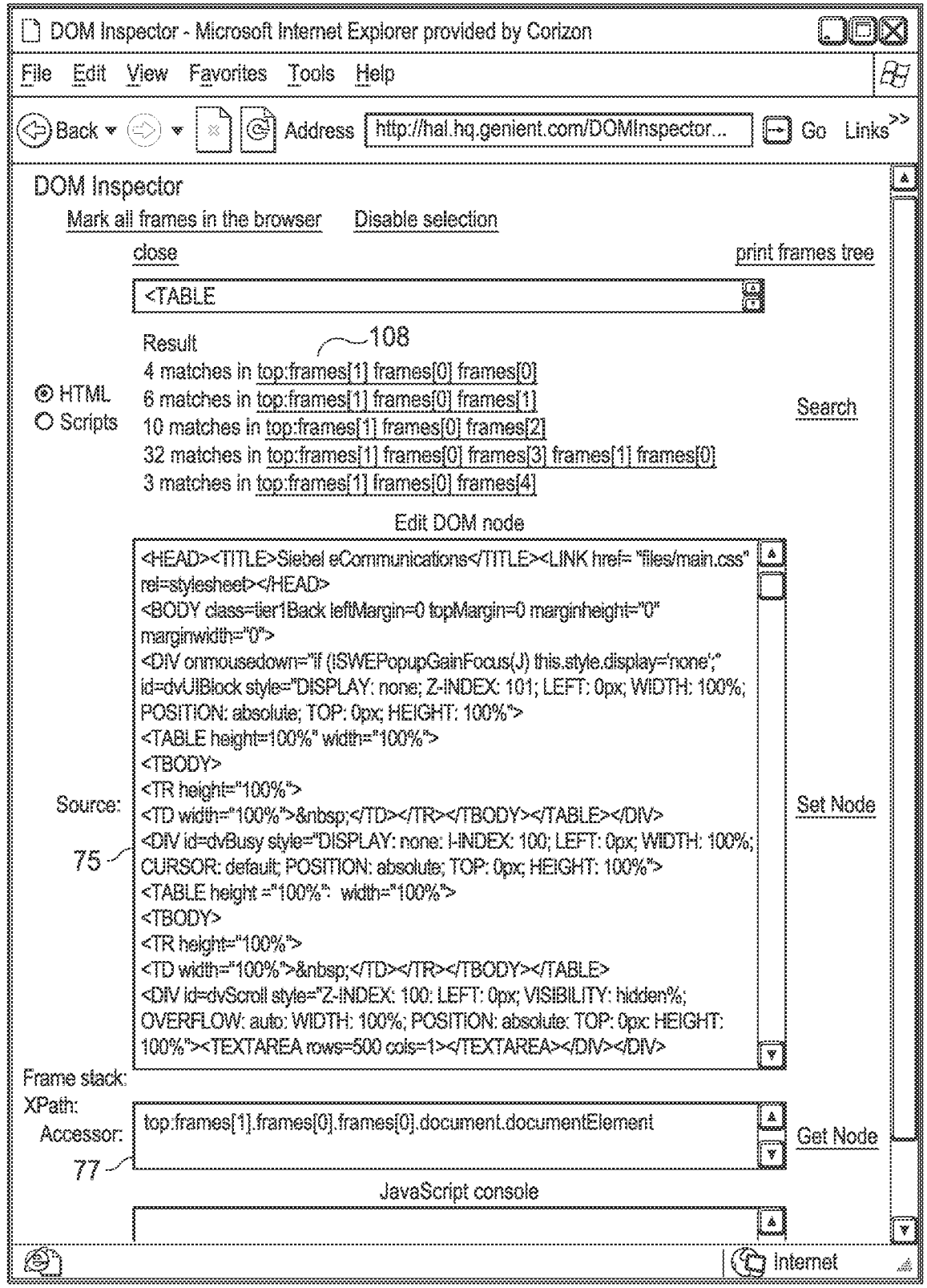
FIG. 41 is a screenshot of the interface of FIG. 40, showing details of a selected search result.

Referring now to FIG. 41, population of the textboxes 75, 77 in response to selection of the link 108 is illustrated. It can be seen that HTML code for the appropriate frame is shown in the textbox 75, with details of the frame being displayed in the text box 77.

The search functionality described above is again useful for developers when developing user applications based upon source applications. For example, if it is known that it is necessary to amend all occurrences of a particular statement within a source application, this statement can be the subject of a search to identify frames within which the statement occurs, before going on to test modifications using the interface described above, and eventually to generating the user application.

Although preferred embodiments of the present invention have been described above, it will be appreciated that various modifications can be made to the described embodiments, without departing from the spirit or scope of the present invention. For example, although various embodiments of the invention have been described above, it will be readily apparent that various features of those embodiments can be combined in various ways. Additionally, where references to programming languages such as HTML and JavaScript have been made in the preceding description, it will be appreciated that the invention is not restricted to any particular programming language, but can instead by implemented in any convenient language. Similarly, where references have been made to some components of the invention operating on a server, while other components operate on a client, it will be appreciated that in some cases the components can be distributed by clients and servers in a large number of different ways, without materially affecting operation of the invention.

The invention claimed is:

1. An apparatus comprising:
a memory having code stored therein; and
one or more processors, coupled to the memory, wherein execution of the code causes the one or more processors to perform operations comprising:
processing a computer readable file defining a user interface, the processing comprising:
within the computer readable file that defines the user interface:
providing the user interface; and
calling methods within the computer program code to implement functionality of the user interface;
associating one or more event handlers with at least one element of the user interface, each of the event handlers being configured to provide information relating to the user interface, wherein associating the one or more event handlers with at least one element of the user interface comprises:
displaying the user interface defined by the computer program code;
calling an indexing method to associate event handlers with components of the user interface, wherein the indexing method calls functions to perform:
traversing the user interface to specify an install event method as a parameter in a traverse of the user interface, wherein performance of the install event method comprises:
for one or more top level frames of the user interface, installing event handlers for the top level frame and one or more subframes of the one or more top level frames, wherein installing the event handlers comprises:
obtaining the one or more top level frames and one or more subframes;
obtaining details of each event associated with the one or more top level frames and each of the one or more subframes; and
installing the event handlers;
receiving a user trigger to select one of the frames of the user interface; and
displaying at least the event handlers associated with the selected frame.

2. The apparatus according to claim 1 wherein one or more of the event handlers are configured to visually alter an associated user interface element.

3. The apparatus according to claim 2, wherein one or more of the event handlers are configured to provide a border surrounding an associated user interface element.

4. The apparatus according to claim 3, wherein one or more of the event handlers are configured to provide a background for an associated user interface element.

5. The apparatus according to claim 4, wherein at least one of the one or more event handlers is triggered by movement of a pointer from a first position not associated with the element of the user interface to a second position associated with the element of the user interface.

6. The apparatus according to claim 4, wherein at least one of the one or more event handlers is triggered by movement of a pointer from a first position associated with the element of the user interface to a second position not associated with the element of the user interface.

7. The apparatus according to claim 4, wherein the user trigger comprises a pointer-click operation over the element of the user interface.

8. The apparatus according to claim 7, comprising associating a plurality of event handlers with at least one element of the user interface.

9. The apparatus according to claim 4, wherein at least one of the one or more event handlers is configured to generate data indicating a hierarchical location of an associated element within the user interface.

10. The apparatus according to claim 4, wherein at least one of the one or more event handlers is configured to (i) generate data indicating a hierarchical location of an associated element within the user interface and (ii) display the data indicating a hierarchical location to a user.

11. The apparatus according to claim 4, wherein at least one of the one or more the event handlers is configured to display computer program code defining the user interface element to a user.

12. The apparatus according to claim 1 wherein the computer readable file is a HTML file.

13. The apparatus according to claim 12, wherein the HTML file is a HTML Application (HTA) file.

14. The apparatus according to claim 13, wherein the one or more top level frames provide a user interface to the user, the user interface being operable to affect operation of the method carried out by the computer readable file.

15. The apparatus according to claim 1 wherein traversing the user interface to specify an install event method as a parameter in a traverse of the user interface further comprises: traversing frames of the user interface to specify an install event method as a parameter in a traverse of each frame in the user interface to process each frame of the user interface in turn.

\* \* \* \* \*